United States Patent
Sollich

(10) Patent No.: US 6,314,559 B1
(45) Date of Patent: Nov. 6, 2001

(54) DEVELOPMENT SYSTEM WITH METHODS FOR ASSISTING A USER WITH INPUTTING SOURCE CODE

(75) Inventor: Peter Franz Valentin Sollich, Santa Cruz, CA (US)

(73) Assignee: Barland Software Corporation, Scotts Valley, CA (US)

( * ) Notice: Subject to any disclaimer, the term of this patent is extended or adjusted under 35 U.S.C. 154(b) by 0 days.

(21) Appl. No.: 08/942,782

(22) Filed: Oct. 2, 1997

(51) Int. Cl.$^7$ ........................................ G06F 9/45
(52) U.S. Cl. .................................. 717/5; 717/10; 717/11
(58) Field of Search .................................. 395/705, 710; 717/5, 10

(56) References Cited

U.S. PATENT DOCUMENTS

| | | | |
|---|---|---|---|
| 4,617,643 | 10/1986 | Klock et al. ........................... | 364/900 |
| 5,339,433 | * 8/1994 | Frid-Nielsen ......................... | 395/700 |
| 5,408,665 | * 4/1995 | Fitzgerald ............................. | 395/700 |
| 5,450,545 | * 9/1995 | Martin et al. ........................ | 717/11 |
| 5,485,618 | 1/1996 | Smith .................................... | 395/700 |
| 5,557,730 | * 9/1996 | Frid-Nielsen ......................... | 395/159 |
| 5,579,520 | * 11/1996 | Bennett ................................. | 395/704 |
| 5,603,021 | 2/1997 | Spencer et al. ..................... | 345/604 |
| 5,724,589 | * 3/1998 | Wold .................................... | 395/701 |
| 5,737,608 | * 4/1998 | Van De Vanter ................... | 717/1 |
| 5,740,444 | * 4/1998 | Frid-Nielsen ......................... | 395/705 |
| 5,748,963 | * 5/1998 | Orr ....................................... | 395/704 |
| 5,754,737 | * 5/1998 | Gipson ................................. | 395/12 |
| 5,778,402 | * 7/1998 | Gipson ................................. | 707/530 |
| 5,787,431 | * 7/1998 | Shaughnessy ....................... | 707/100 |
| 5,854,936 | * 12/1998 | Pickett ................................. | 395/710 |

OTHER PUBLICATIONS

McFedries, P.; Visual Basic for Applications Unleashed. Sams, Macmillian Computer Publishing, New York, NY, Chapter 1, Mar. 1997.*

Rubenking, N.; "Delphi 4 delivers potent programming". PC Magazine, v16, n15, p64(1), Sep. 1997.*

Nicolaisen, N.; "Go beyond text editing, using the advances in Source Insight". Computer Shopper, v16, n4, p584(3), Apr. 1996.*

Parker, T.; "TakeFive's SNiFF plus lets you tailor your own development environment". UNIX Review, v15, n4, p61(2), Apr. 1997.*

Mann, T.; Visual Basic 5 Developer's Guide. Sams, Macmillian Computer Publishing, New York, NY, Chapter 1, Jun. 1997.*

(List continued on next page.)

Primary Examiner—Mark R. Powell
Assistant Examiner—Kelvin Booker
(74) Attorney, Agent, or Firm—Darby & Darby

(57) ABSTRACT

A visual development system having an interface which assists a user with input of source code expressions and statements during creation of a computer program is described. The interface includes an Integrated Development Environment (IDE) interface having a code editor with "Code Completion" and "Code Parameter" features for displaying context sensitive pop-up windows within a source code file. Code Completion is implemented at the user interface level by displaying a Code Completion dialog box after the user enters a record or class name followed by a period. For a class, the dialog lists the properties, methods and events appropriate to the class. For a record or structure, the dialog lists the data members of the record. To complete entry of the expression, the user need only select an item from the dialog list, whereupon the system automatically enters the selected item in the code. Code completion also operates during input of assignment statements. When the user enters an assignment statement for a variable and presses a hot key (e.g., <ctrl><space_bar>), a list of arguments valid for the variable is displayed. Here, the user can simply select an argument to be entered in the code. Similarly, the user can bring up a list of arguments when typing a procedure, function, or method call and needs to add an argument. In this manner, the user can view the required arguments for a method as he or she enters a method, function, or procedure call.

5 Claims, 34 Drawing Sheets

OTHER PUBLICATIONS

Powell, J.; "Delphi 3 Client/Server Suite–Delphi's RAD New Features Shine". Windows Magazine, n806, p158, Jun. 1997.*

Windows Magazine; "Application Development–Programmers need to meet more demands than ever. These products can help". Windows Magazine, n806A, p123, Jun. 1997.*

Coffee, P.; "Delphi 3.0: Proof that Pascal lives". Windows Sources, v5, n6, p92, Jun. 1997.*

Nesbitt, K.; "Borland Delphi: third time's a charm". Database Web Advisor, v15, n7, p70(6), Jul. 1997.*

* cited by examiner

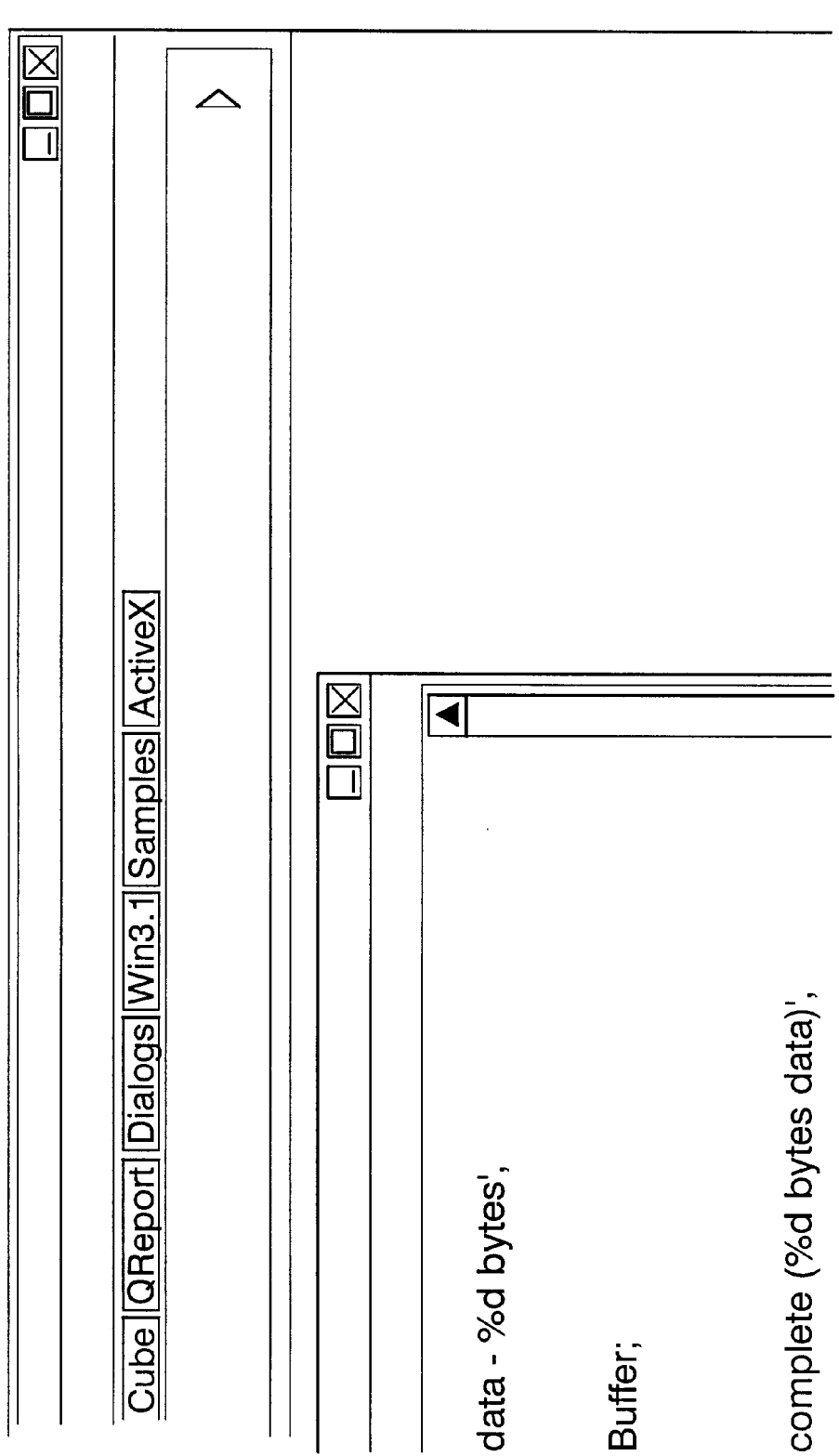
FIG. 5A(2)

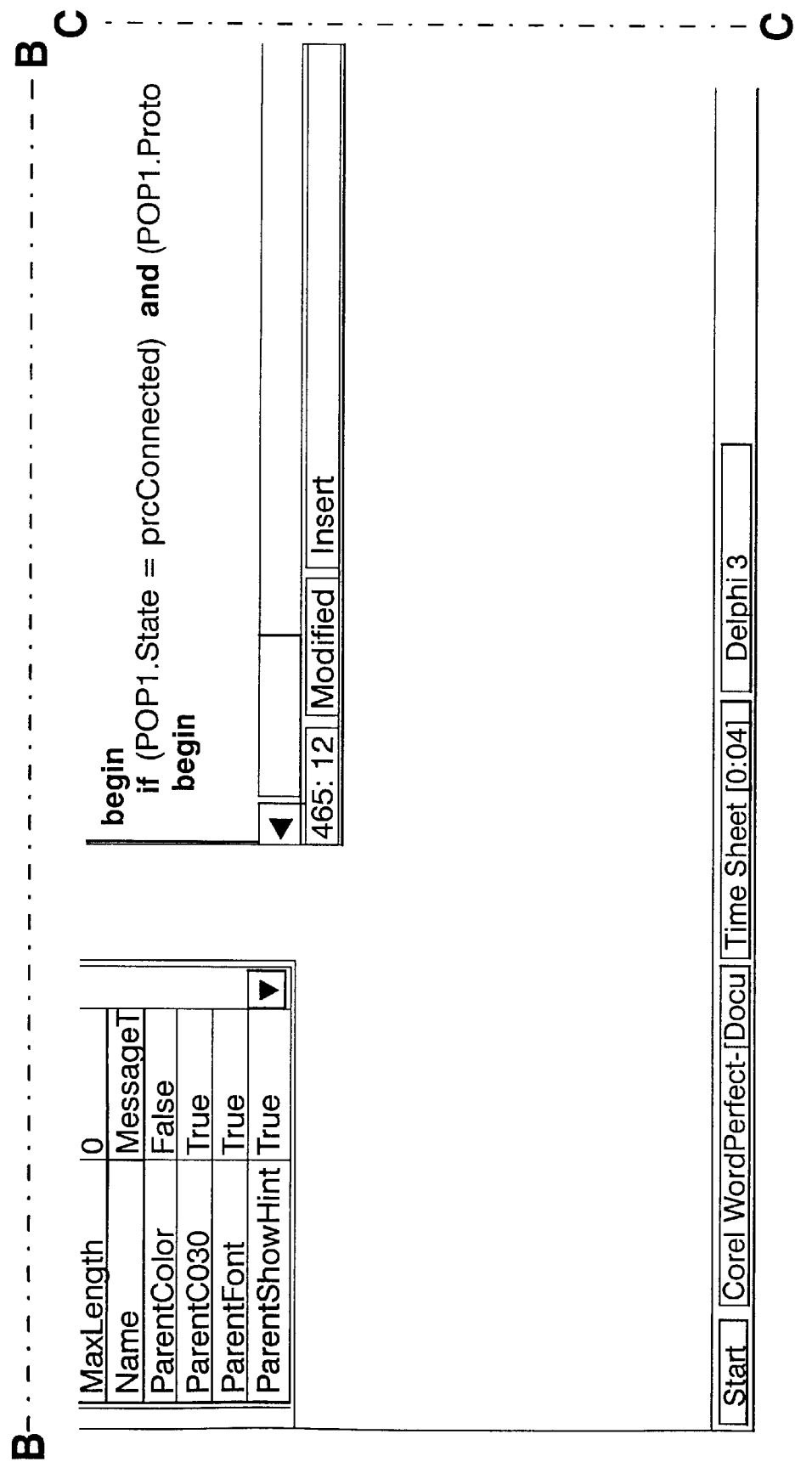
FIG. 5A(3)

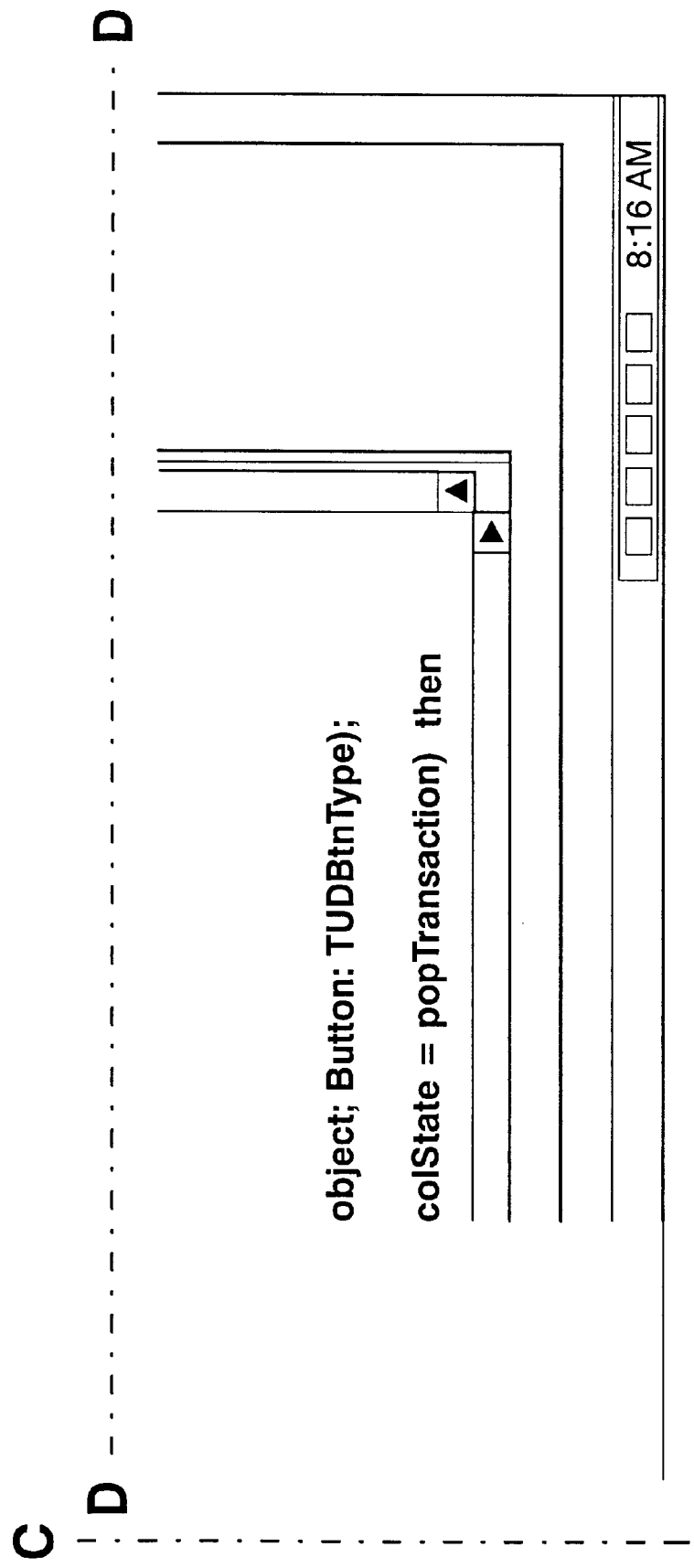
FIG. 5A(4)

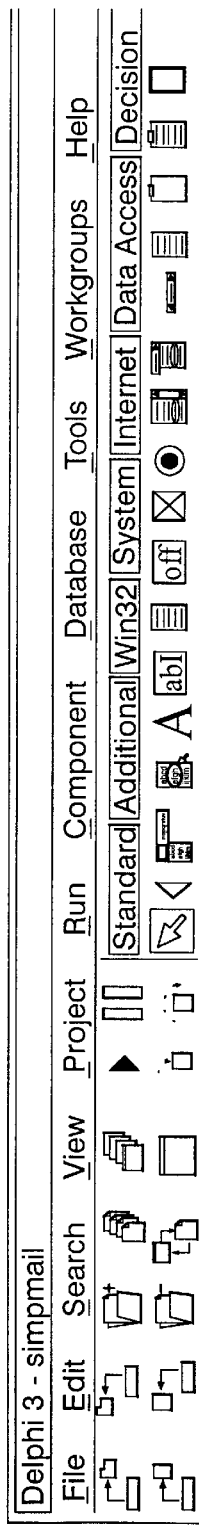
FIG. 5B(1)

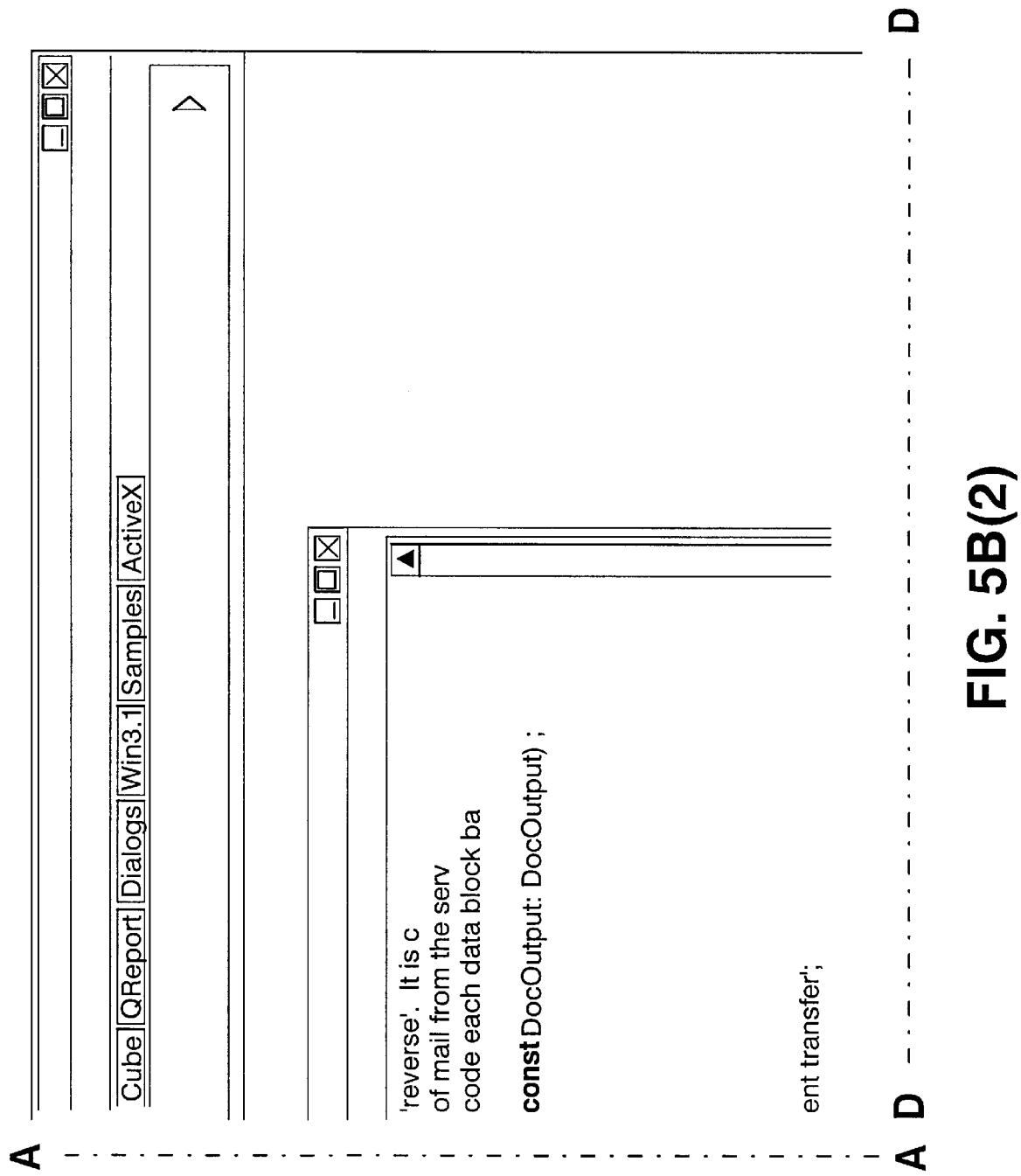
FIG. 5B(2)

```
for I := 1 to DocOutput.Headers.Count do
  mReadMessage.Lines.Add(DocOutput.He
    DocOutput.Headers.Item(I).Value);
end
``` icDocData:

442: 11 | Modified | Insert

| MaxLength | 0 |
| Name | MessageT |
| ParentColor | False |
| ParentC030 | True |
| ParentFont | True |
| ParentShowHint | True |

Start | Corel WordPerfect-[Docu | Delphi 3 | Corel PHOTO-PAINT 7

FIG. 5B(3)

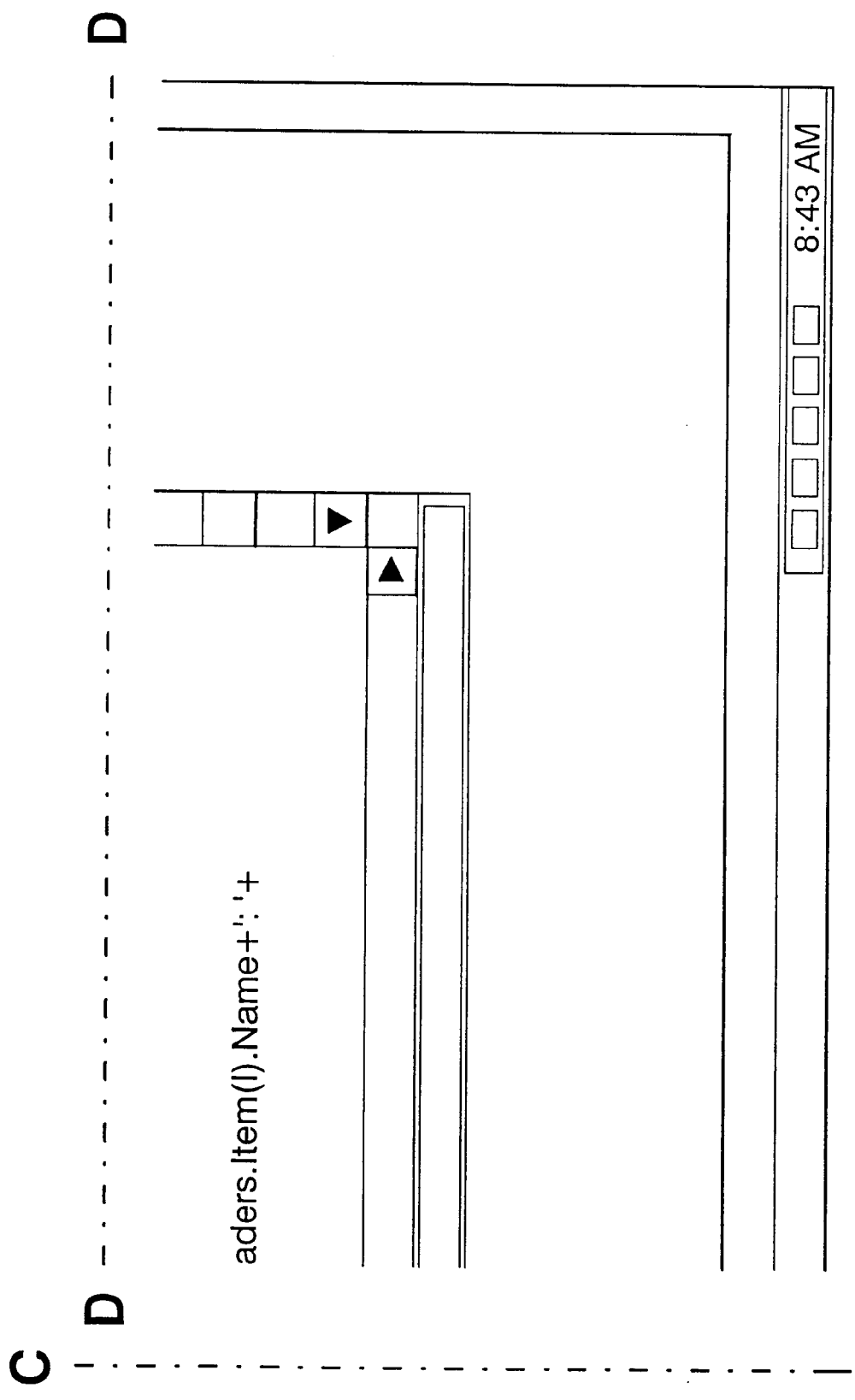
FIG. 5B(4)

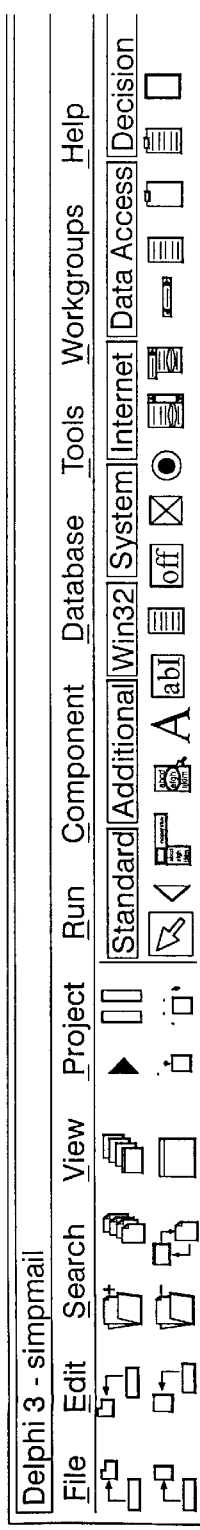
FIG. 5C(1)

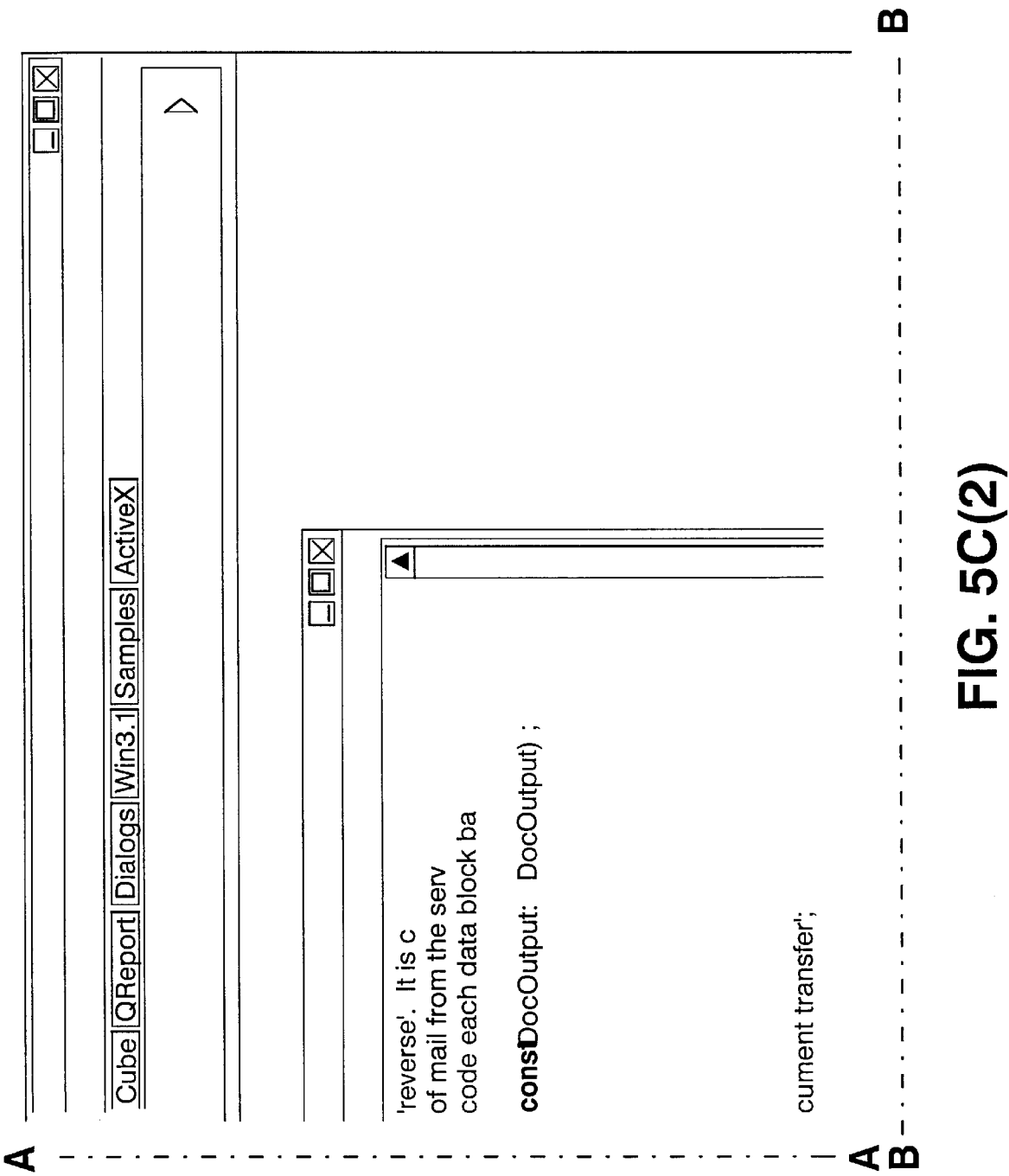
FIG. 5C(2)

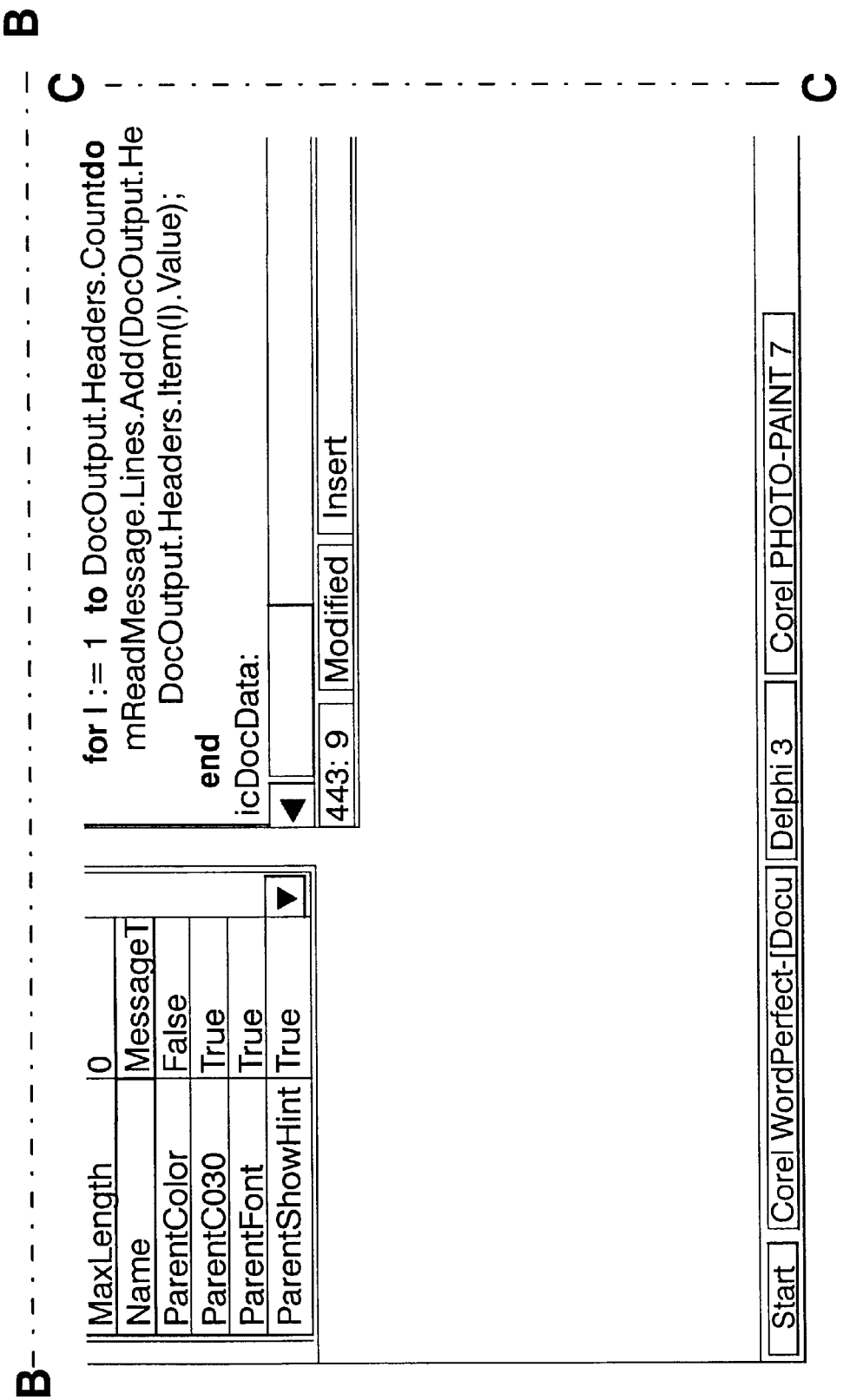
FIG. 5C(3)

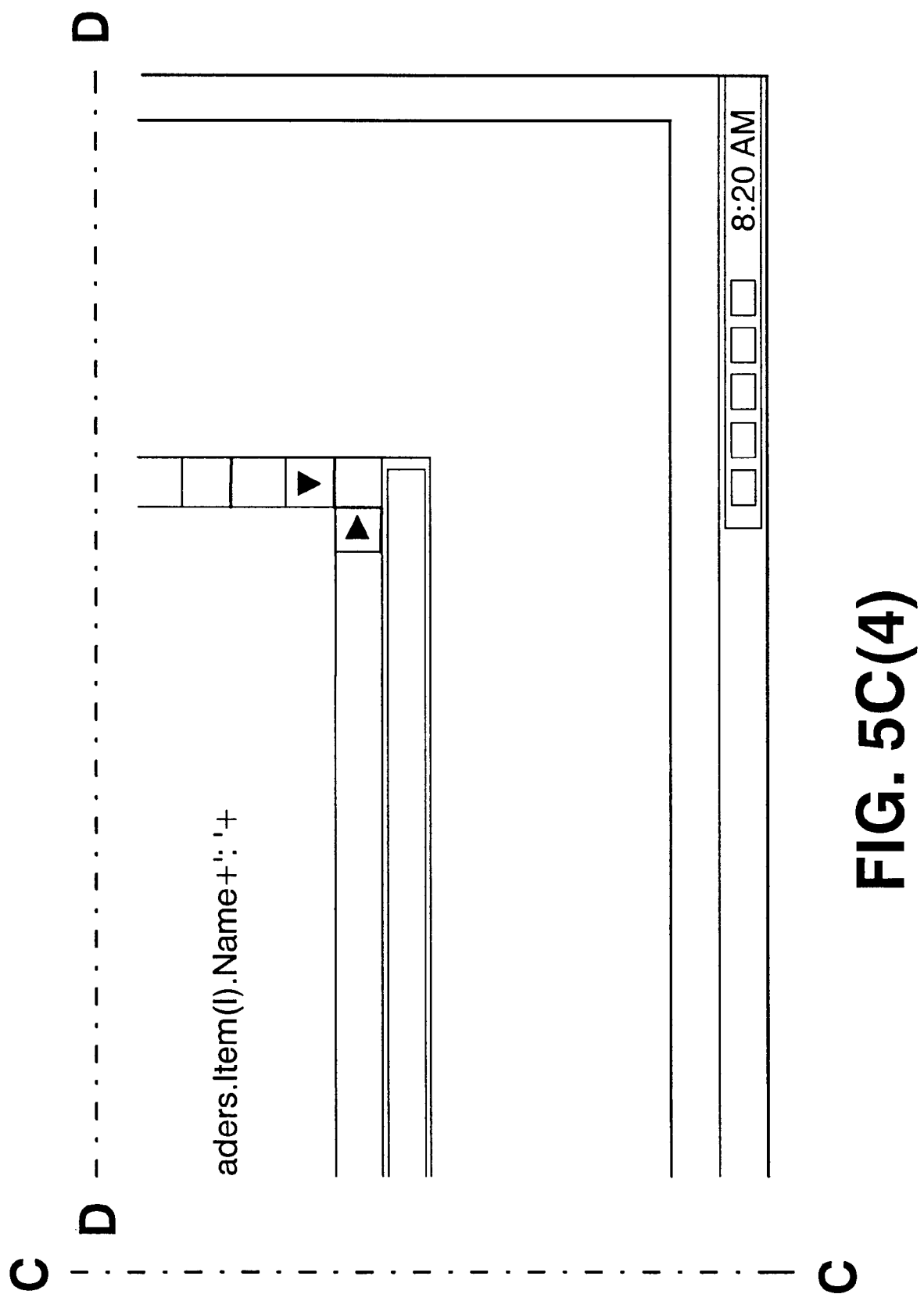
FIG. 5C(4)

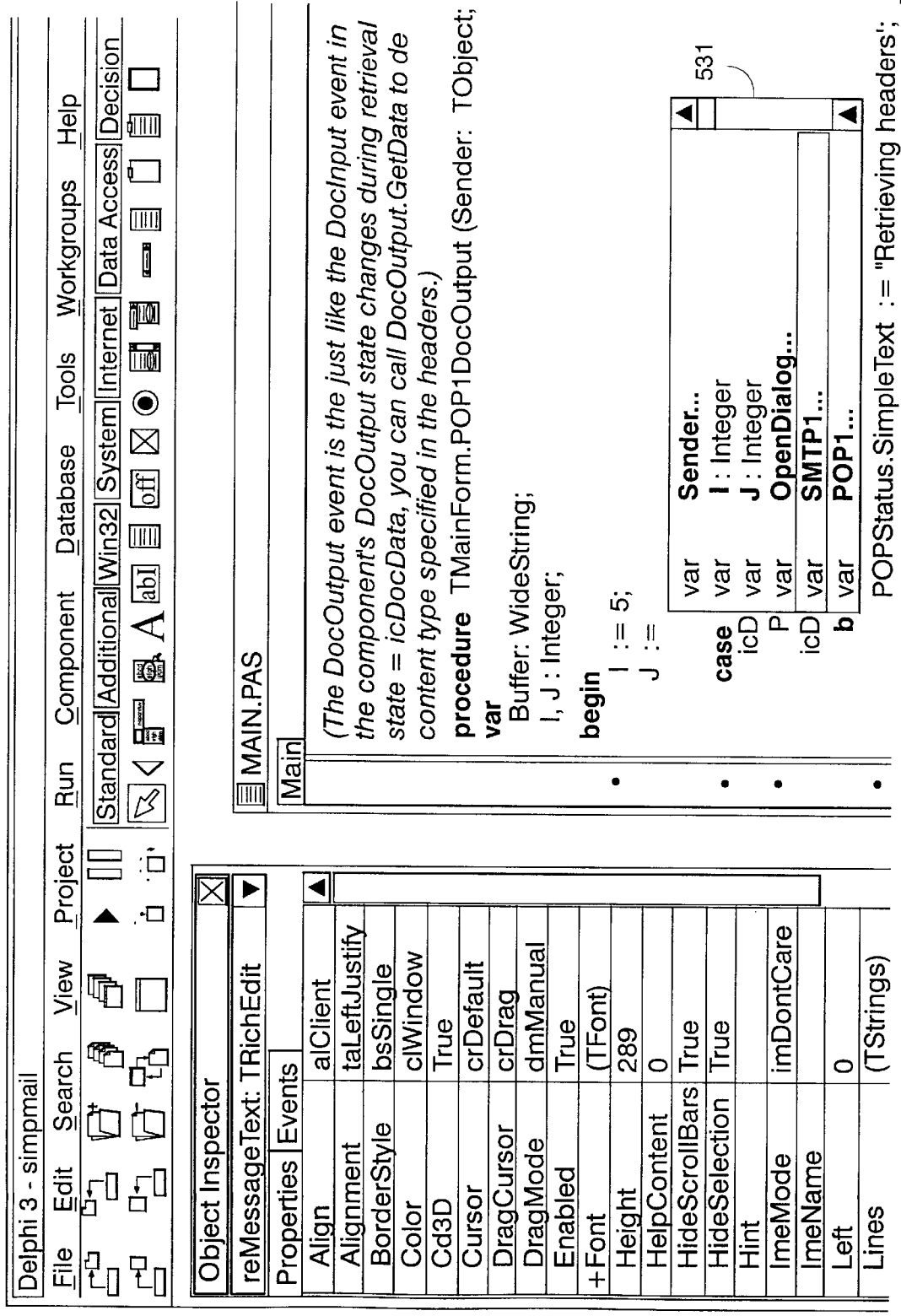
FIG. 5D(1)

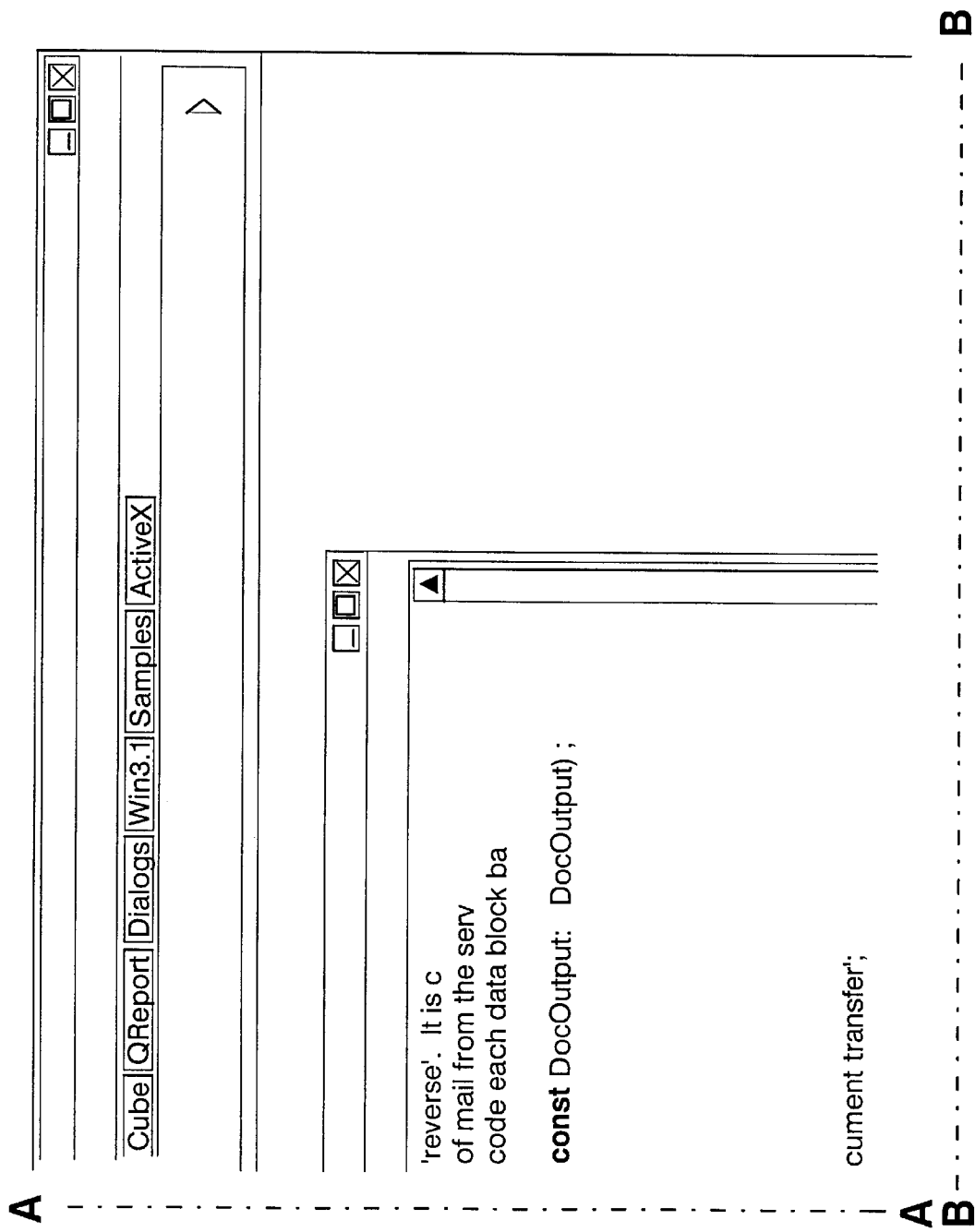
FIG. 5D(2)

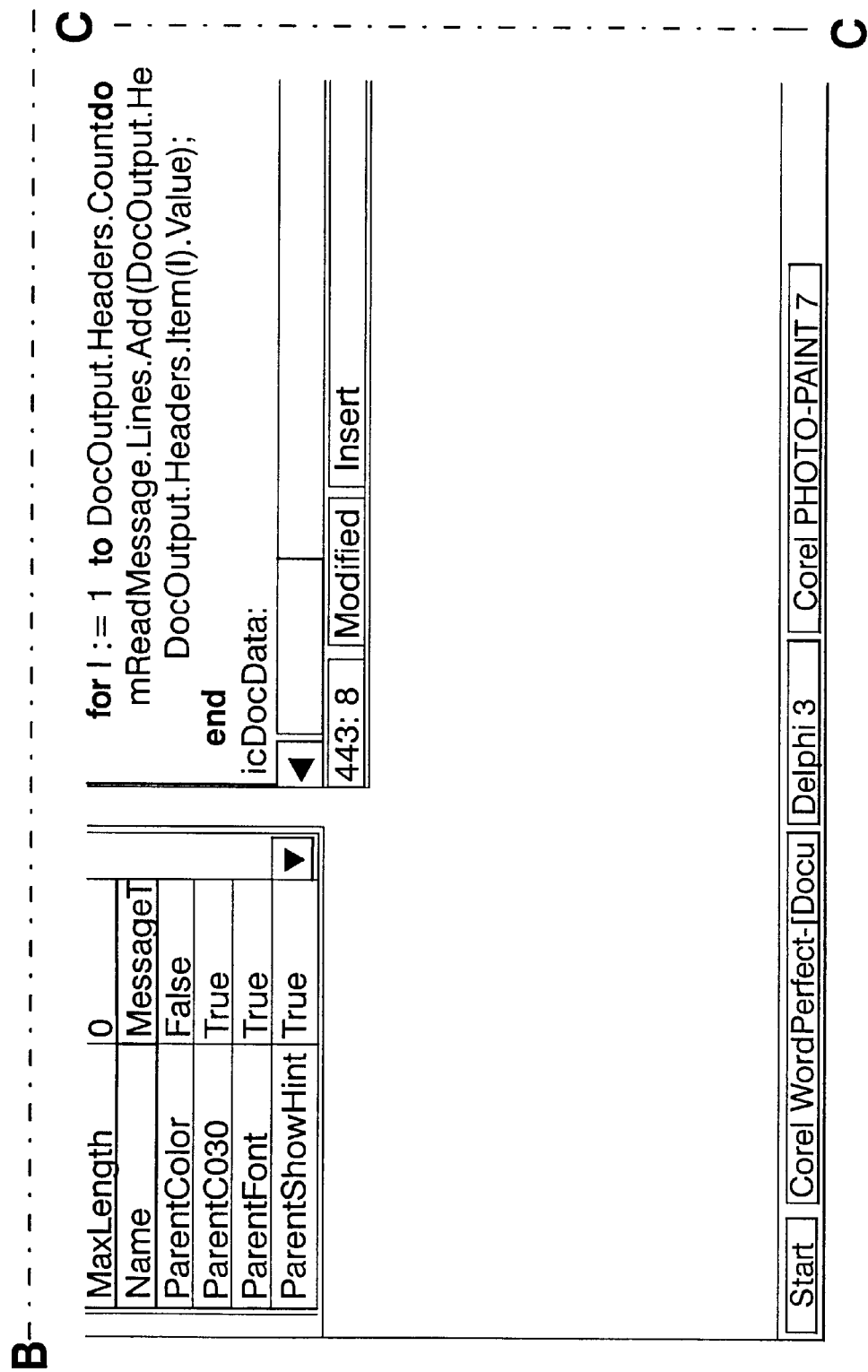
FIG. 5D(3)

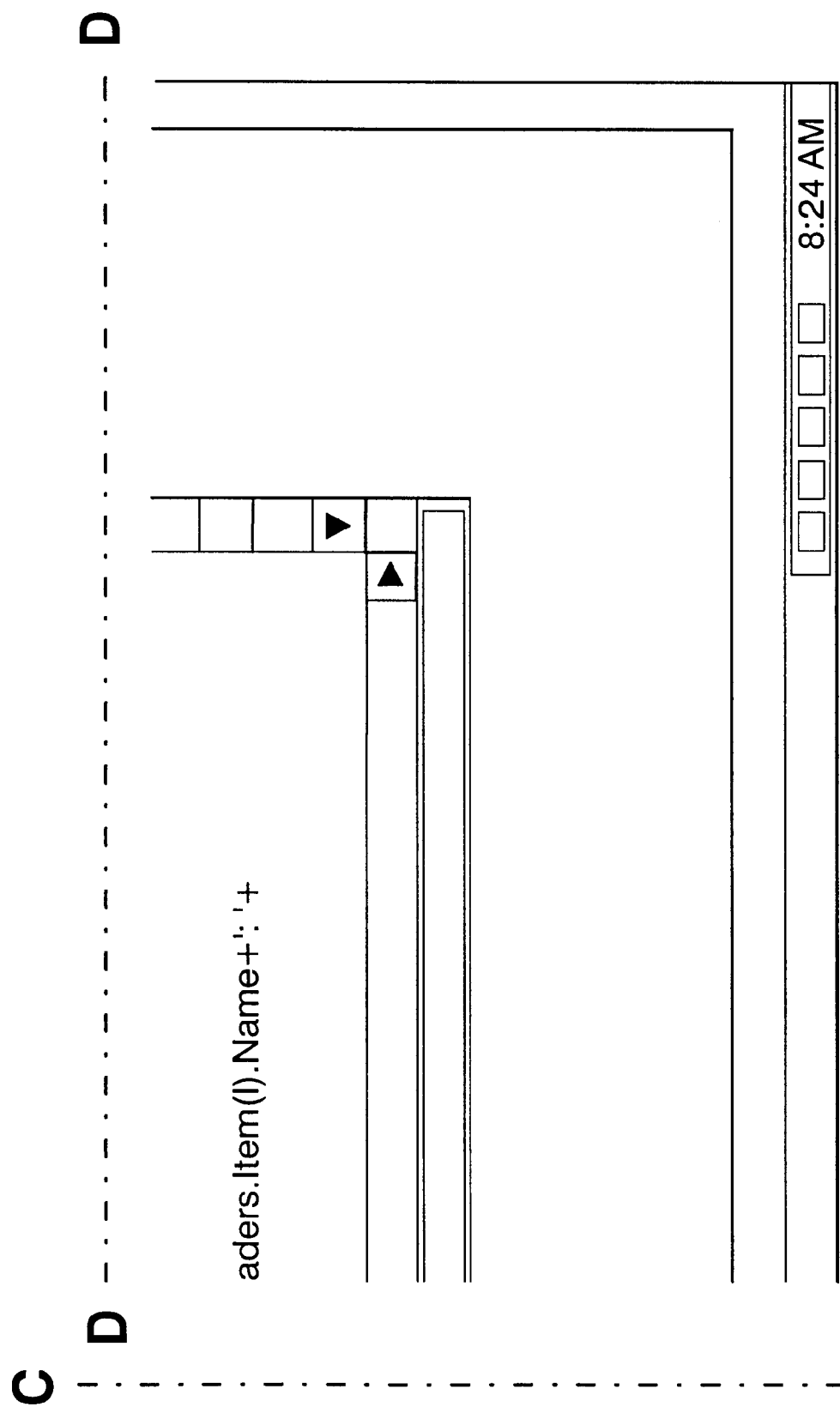
FIG. 5D(4)

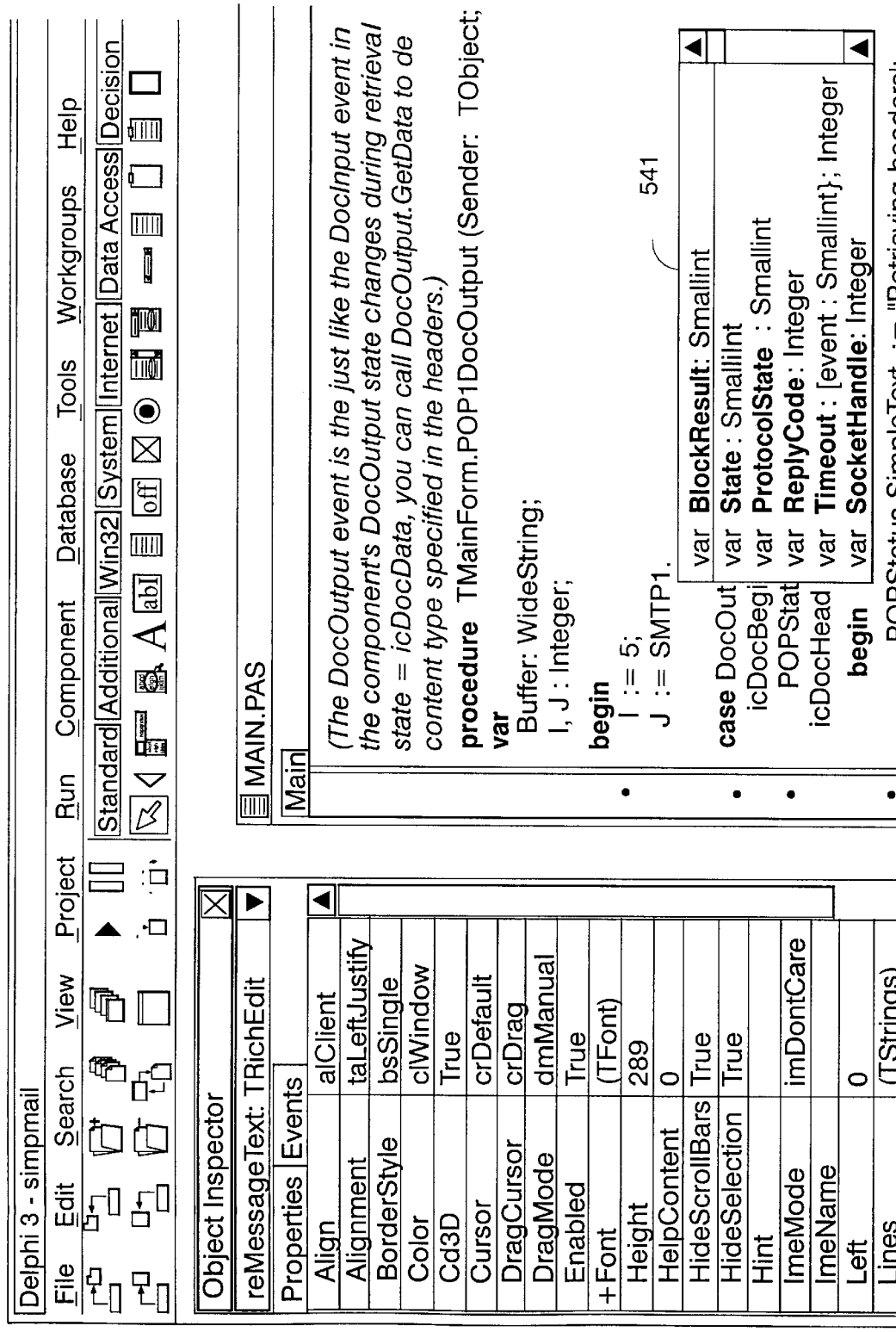
FIG. 5E(1)

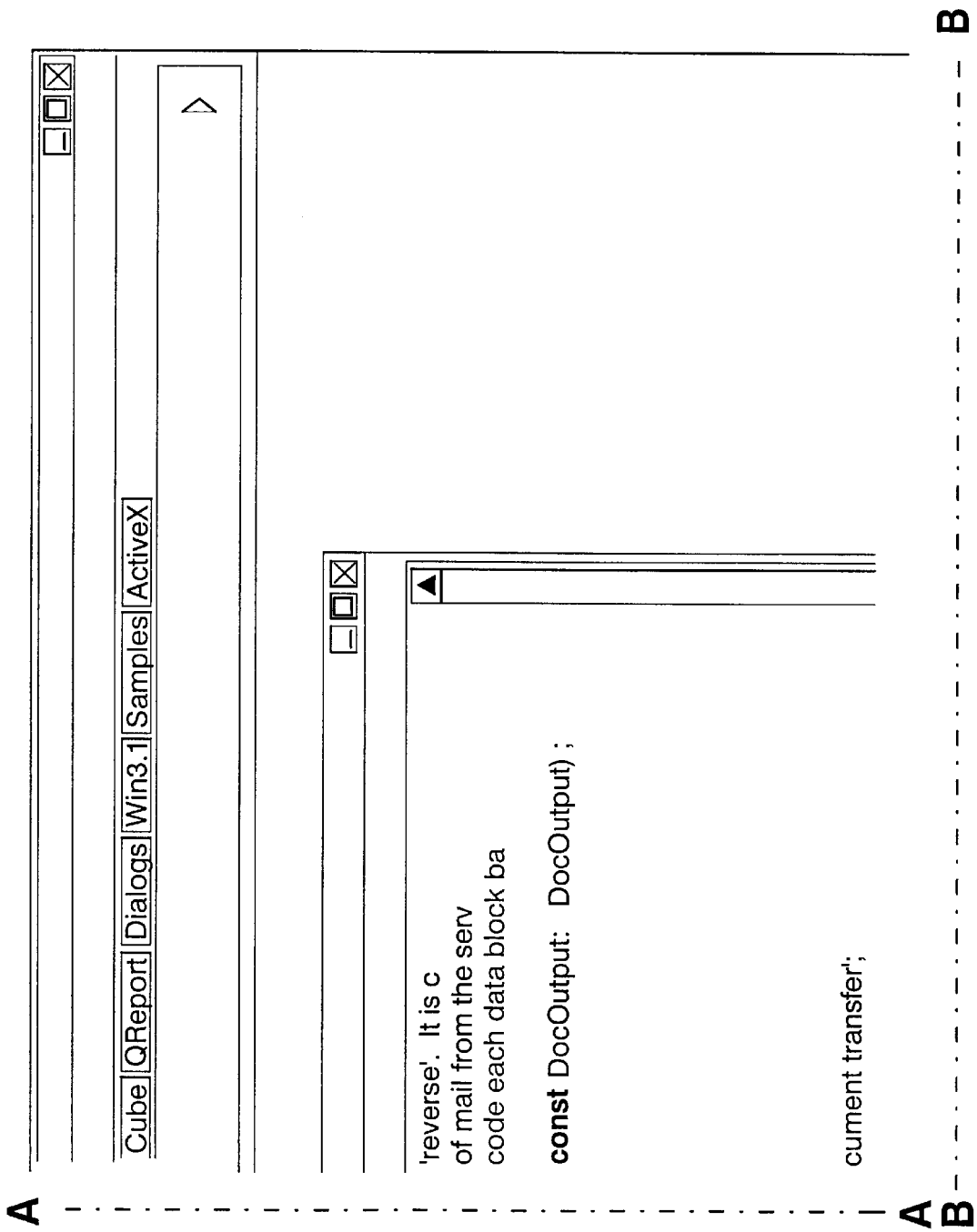
FIG. 5E(2)

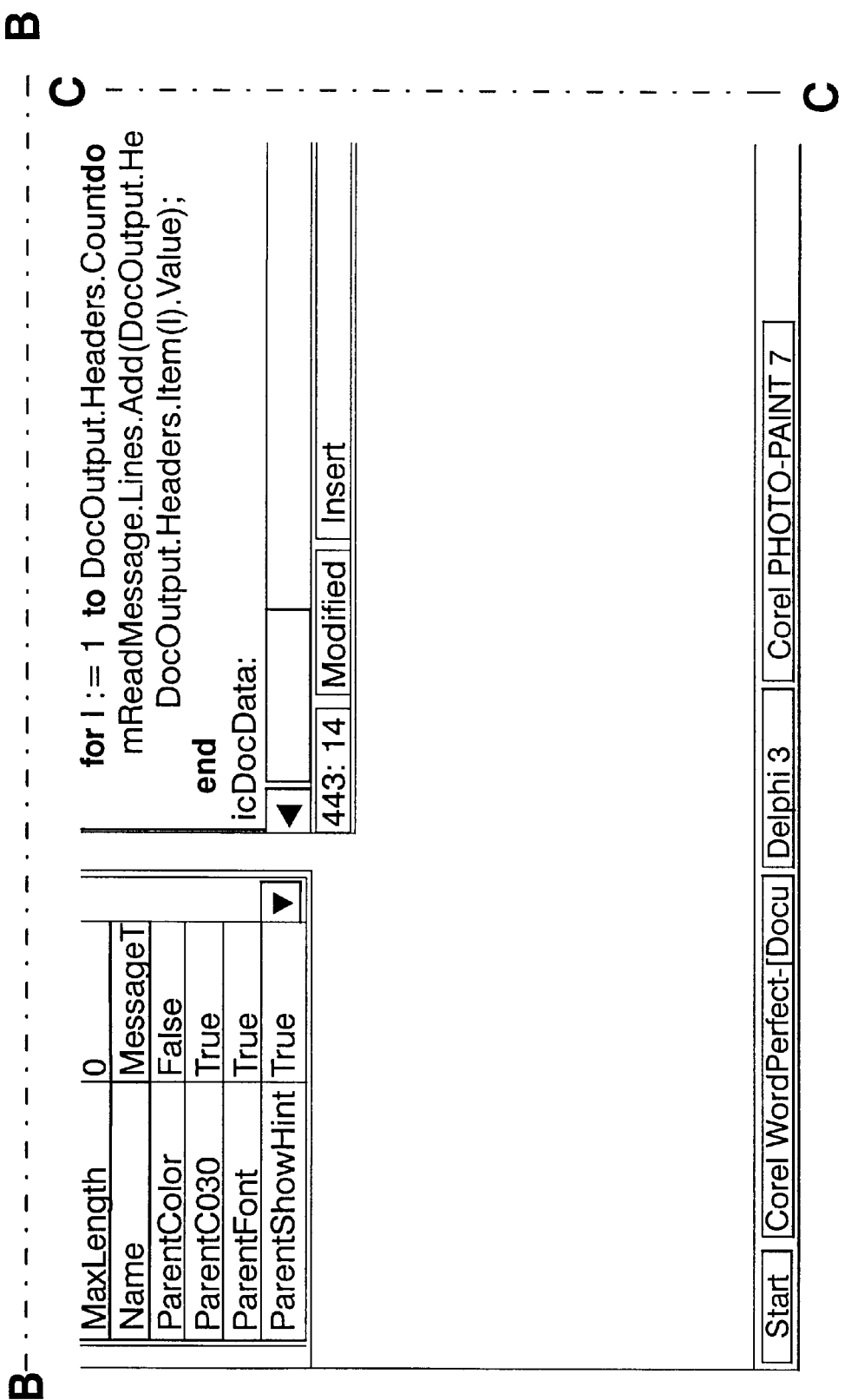
FIG. 5E(3)

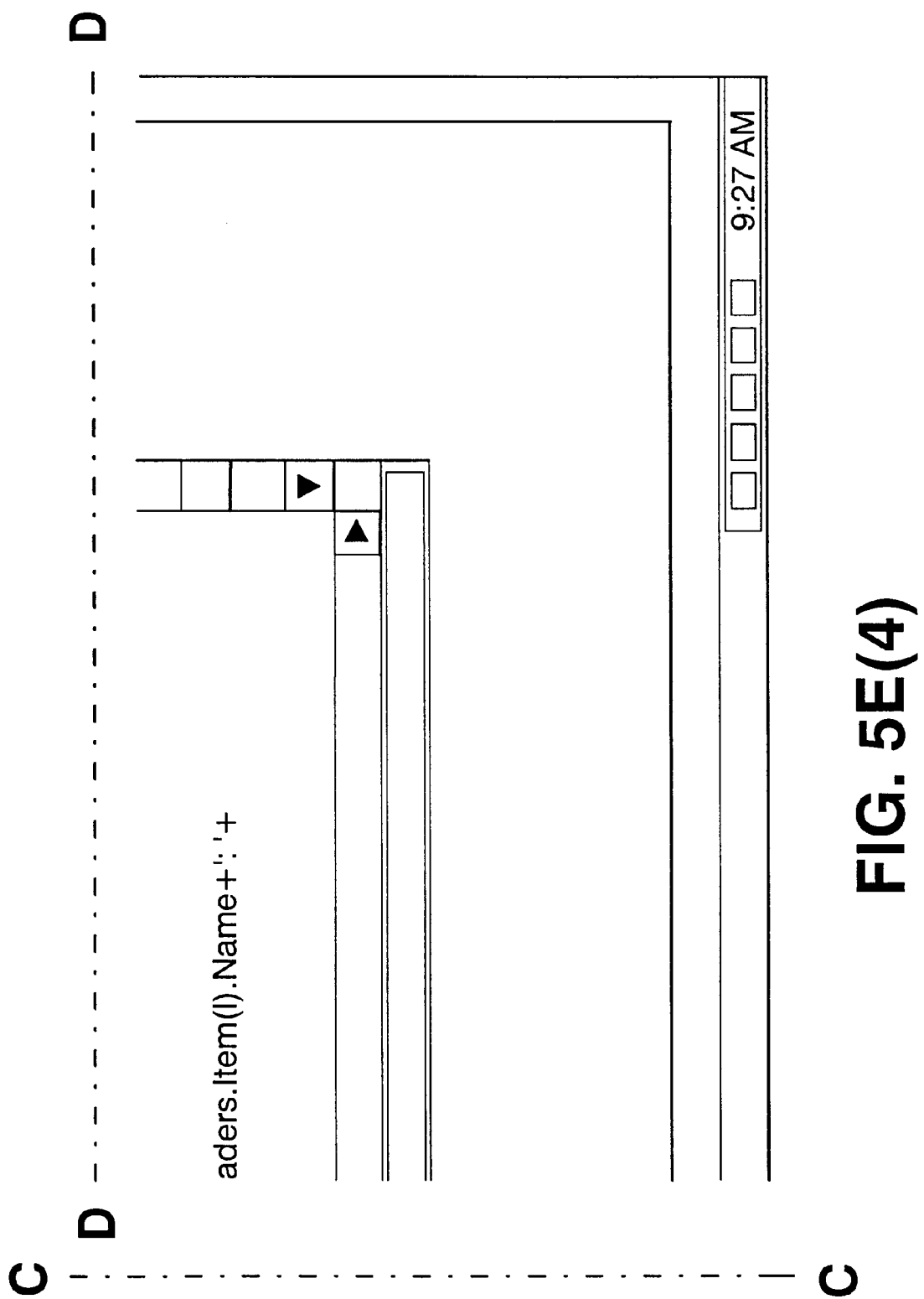
FIG. 5E(4)

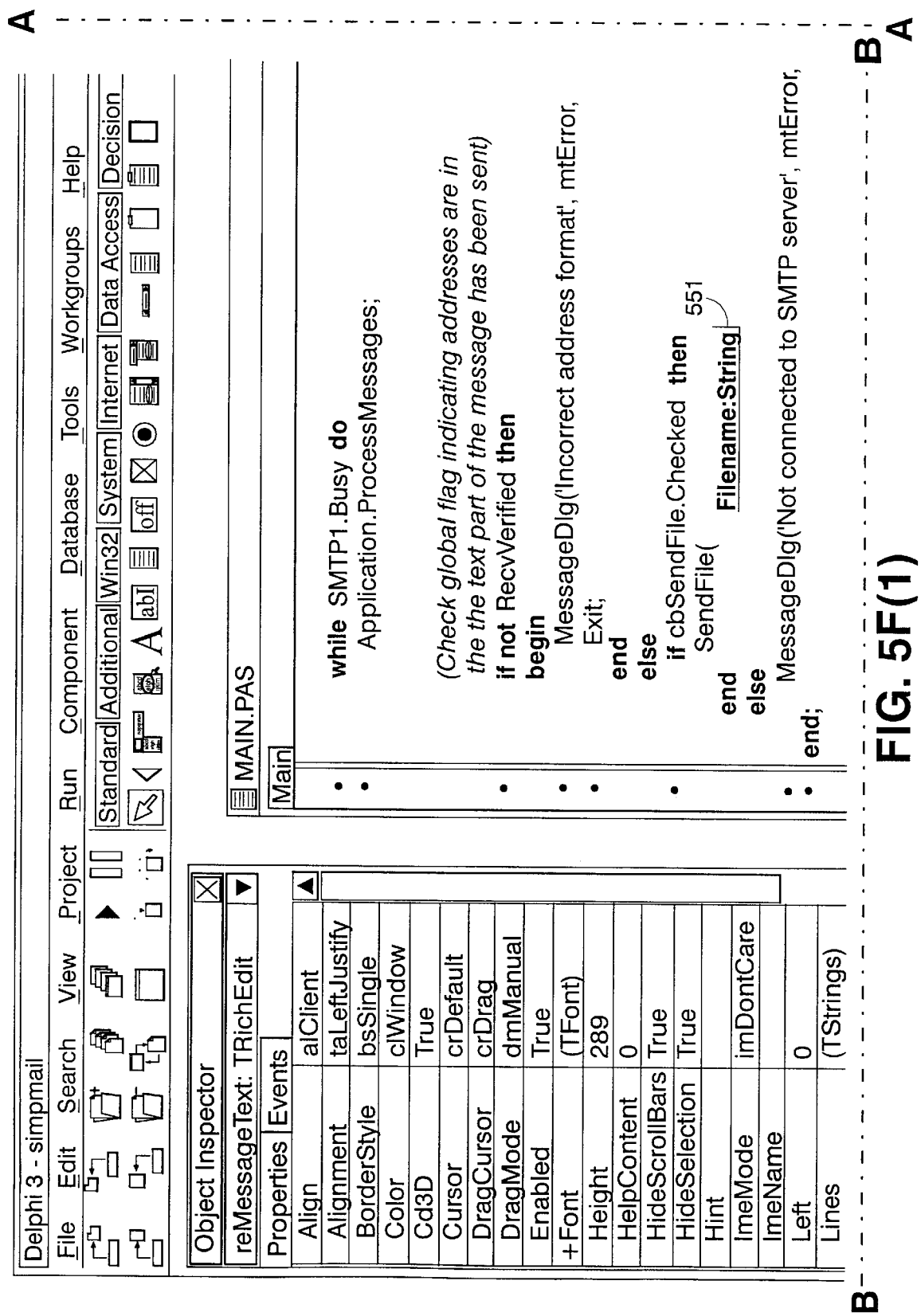
FIG. 5F(1)

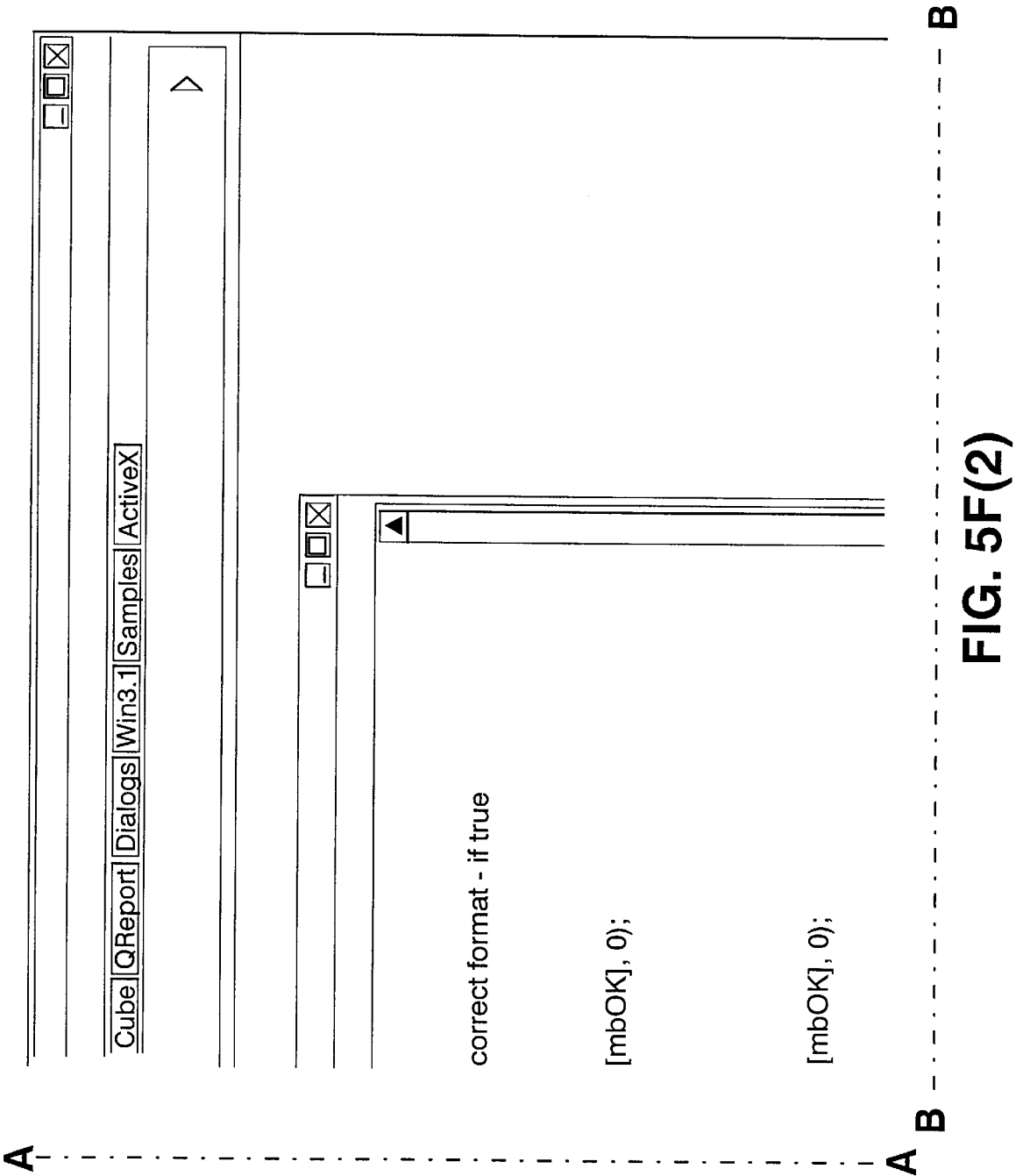
FIG. 5F(2)

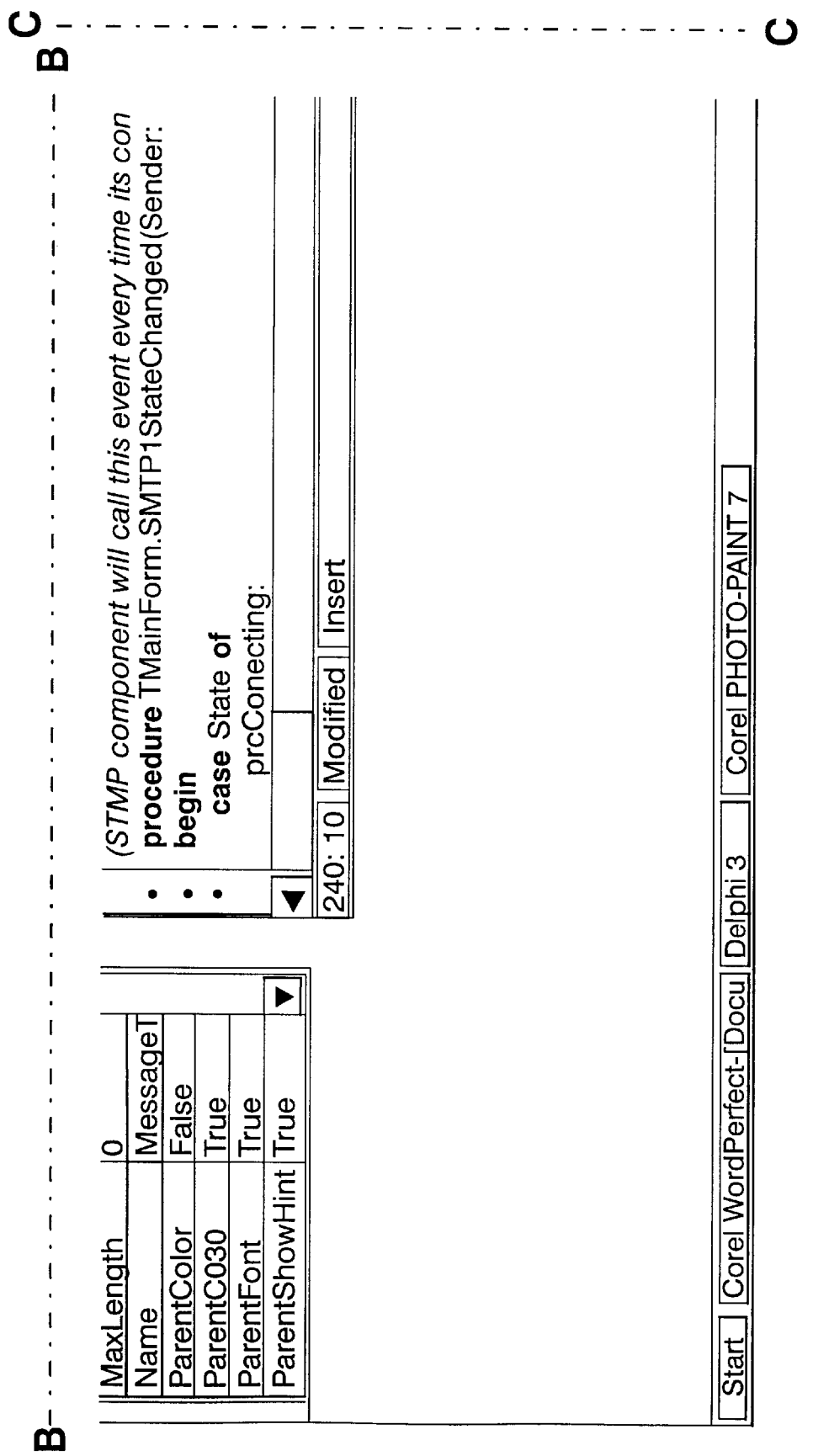
FIG. 5F(3)

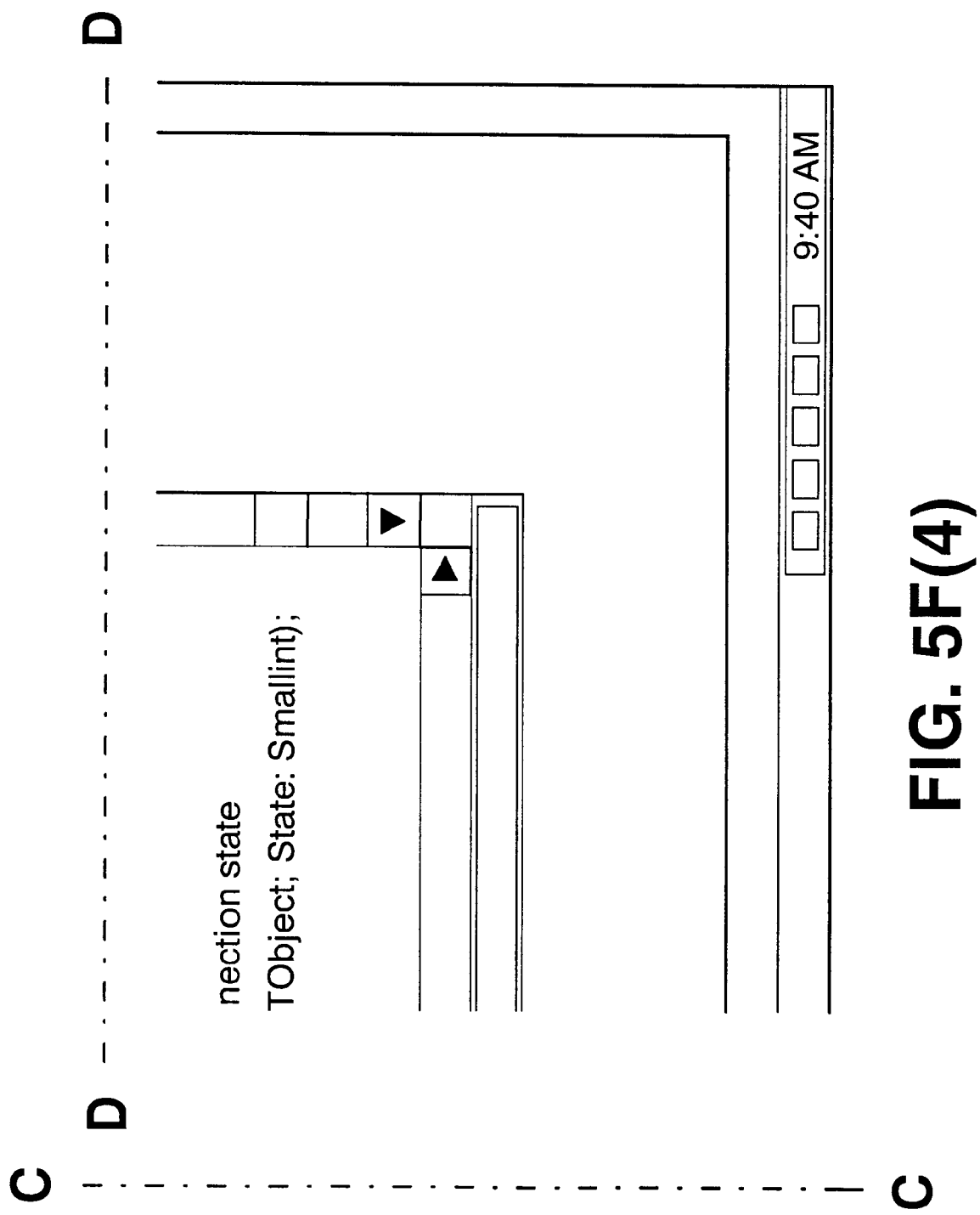
FIG. 5F(4)

DEVELOPMENT SYSTEM WITH METHODS FOR ASSISTING A USER WITH INPUTTING SOURCE CODE

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to system and methods for creating software programs. More particularly, the present invention relates to a visual development system and methods for assisting users with the task of creating source code during development of software programs.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program written in the high-level language is called the "source code" or source program. The ultimate output of the compiler is an intermediate module or "object module," which includes instructions for execution by a target processor. In the context of Borland's Turbo Pascal and Object Pascal, the intermediate module is a Pascal "unit" (e.g., .TPU file). Although an object module includes code for instructing the operation of a computer, the object module itself is not usually in a form which may be directly executed by a computer. Instead, it must undergo a "linking" operation before the final executable program is created.

Linking may be thought of as the general process of combining or linking together one or more compiled object modules or units to create an executable program. This task usually falls to a program called a "linker." In typical operation, a linker receives, either from the user or from an integrated compiler, a list of modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (typically an .EXE file) which, after testing and quality assurance, is passed to the user with appropriate installation and usage instructions.

"Visual" development environments, such as Borland's Delphi™, Microsoft® Visual Basic, and Powersoft's PowerBuilder®, are rapidly becoming preferred development tools for quickly creating production applications. Such environments are characterized by an Integrated Development Environment (IDE) providing a form designer or painter, a property getter/setter manager ("inspector"), a project manager, a tool palette (with objects which the user can drag and drop on forms), an editor, a compiler, and a linker. In general operation, the user "paints" objects on one or more forms, using the form painter. Attributes and properties of the objects on the forms can be modified using the property manager or inspector. In conjunction with this operation, the user attaches or associates program code with particular objects on screen (e.g., button object); the editor is used to edit program code which has been attached to particular objects.

At various points during this development process, the user "compiles" the project into a program which is executable on a target platform. For Microsoft Visual Basic and Powersoft PowerBuilder, programs are "pseudo-compiled" into p-code ("pseudo" codes) modules. Each p-code module comprises byte codes which, for execution of the program, are interpreted at runtime by a runtime interpreter. Runtime interpreters themselves are usually large programs (e.g., VBRUNxx.DLL for Visual Basic) which must be distributed with the programs in order for them to run. In the instance of Delphi™, on the other hand, programs are compiled and linked into true machine code, thus yielding standalone executable programs; no runtime interpreter is needed.

To a large extent, the progress of a particular software development project is tied to the progress of the task of writing source code or "coding." It is highly desirable, therefore, to facilitate this task. Although there has been some effort to address this task by increasing code reuse, one nevertheless finds that core functionality of a program must often at some point still be coded by hand. Since software components are often constructed from complex classes comprising numerous class members and methods, the developer user typically spends a lot of time looking up help information (e.g., class definitions) for such components before he or she can use such a component. Thus even with the high degree of reuse provided by component-based visual development environments, developers still must spend substantial amounts of time coding functionality to suit a new project, and of that, developers spend substantial amounts of time referencing on-line help information for understanding how to use numerous components.

What is needed is a system providing methods for assisting users with inputting source code—that is, the fundamental task of writing the individual code statements and expressions which comprise a software program. Such a system should free developers from having to repeatedly reference on-line reference or help materials. The present invention fulfills this and other needs.

SUMMARY OF THE INVENTION

A visual development system of the present invention includes a compiler, a linker, and an interface. Through the interface, the developer user "paints" forms with objects and supplies source listings (i.e., enters source code) for the compiler. From the source code or listings, once compiled by the compiler and linked with other run-time or support files by the linker, the system generates a computer program, which may be executed by a target processor(s).

The interface includes an Integrated Development Environment (IDE) interface having a code editor. The IDE provides "Code Insight" functionality to the code editor for displaying context sensitive pop-up windows within a source code file. Of particular interest to the present invention are Code Completion and Code Parameter features of Code Insight.

Code Completion is implemented at the user interface level by displaying a Code Completion dialog box after the user enters a record or class name followed by a period. For a class, the dialog lists the properties, methods and events appropriate to the class. For a record or structure, the dialog lists the data members of the record. To complete entry of the expression, the user need only select an item from the dialog list, whereupon the system automatically enters the selected item in the code.

Code Completion also operates during input of assignment statements. When the user enters an assignment statement for a variable and presses a hot key (e.g., <ctrl><space_bar>), a list of arguments valid for the variable is displayed. Here, the user can simply select an argument to be entered in the code. Additionally, the user can select a type which itself is not appropriate (e.g., record type) but nevertheless includes a nested data member having a type which is valid. In an integer assignment statement, for example, the user can select a type variable SMTP1, a structure of type TSMTP which contains an integer data member. Upon the user entering the dot operator after SMTP1, the system displays a list of valid data members for SMTP1, that is, the data members which are assignment compatible for the integer assignment. Now, the user can simply select a valid member to be entered in the code.

Similarly, the user can bring up a list of arguments when typing a procedure, function, or method call and needs to add an argument. Consider, for instance, a scenario where the user has begun entry of a SendFile method call. The SendFile method itself is defined elsewhere in the code as follows.

procedure SendFile(Filename: string);

Upon the user entering the opening parenthesis, the system automatically displays parameter information for the call. In this manner, the user can view the required arguments for a method as he or she enters a method, function, or procedure call.

BRIEF DESCRIPTION OF THE DRAWINGS

FIGS. 3A–D are together a screen shot illustrating a preferred interface of an application development environment in which the present invention is embodied.

FIGS. 5A(1)–(4), 5B(1)–(4), 5C(1)–(4), 5D(1)–(4), and 5E(1)–(4) are screen shots illustrating a "Code Completion" user interface methodology of the present invention.

FIG. 5F(1)–(4) are together a screen shot illustrating a Code Parameters user interface methodology of the present invention.

DETAILED DESCRIPTION OF A PREFERRED EMBODIMENT

The following description will focus on a preferred embodiment of the present invention (and certain alternatives) embodied in a visual development environment running on an Intel 80x86-compatible computer operating under an event-driven operating system, such as the Microsoft® Windows NT or 9x environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

General Architecture

A. System Hardware

Figure 1A:
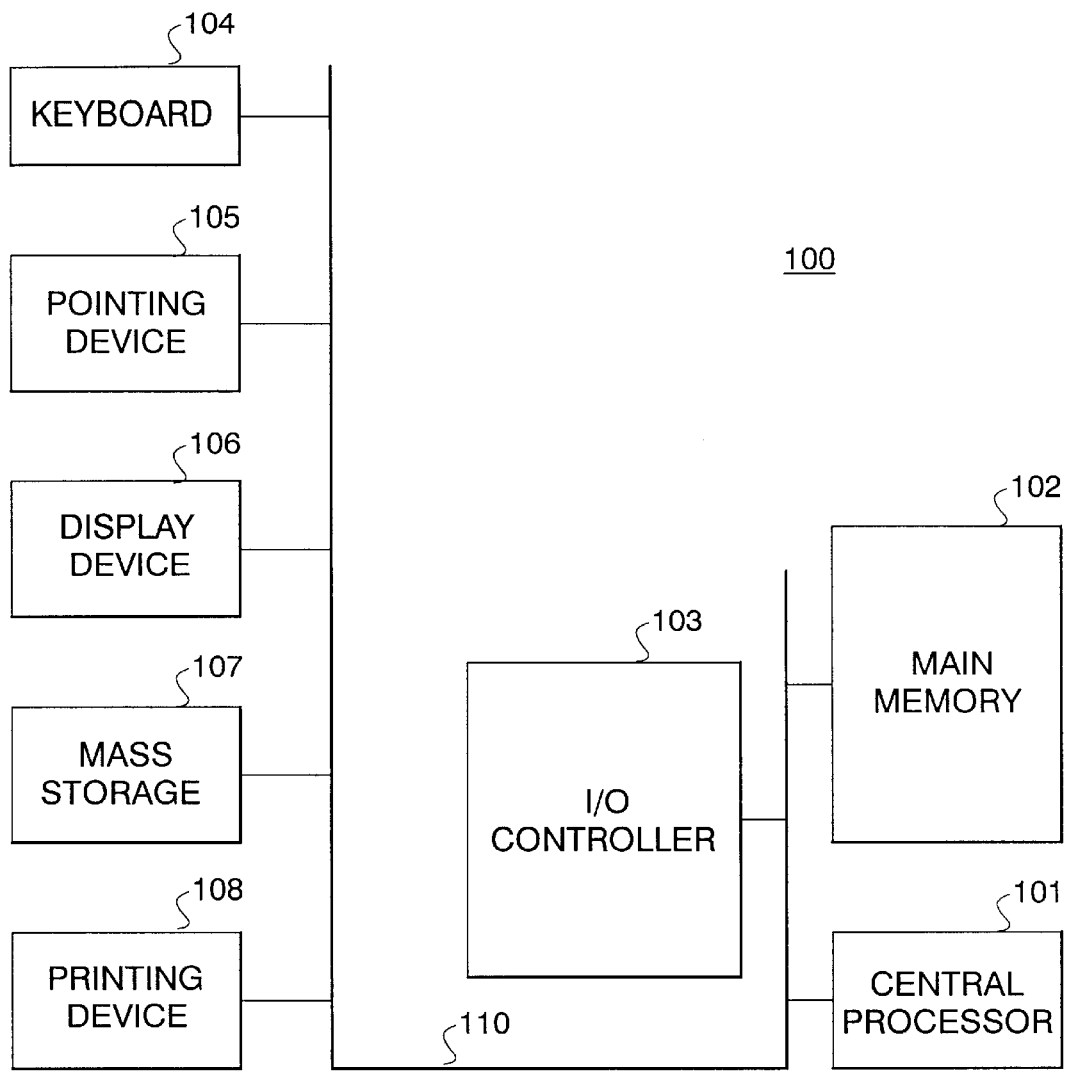
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., removable disk, floppy disk, fixed disk, optical disk (including CD-ROM), and the like). Additional input/output devices, such as a printing device 108, may be provided with the system 100 as desired. As shown, the various components of the system 100 communicate through a system bus 110 or similar architecture. In a preferred embodiment, the system 100 includes an IBM-compatible personal computer, available from a variety of vendors (including IBM of Armonk, N.Y.).

B. System Software

Figure 1B:
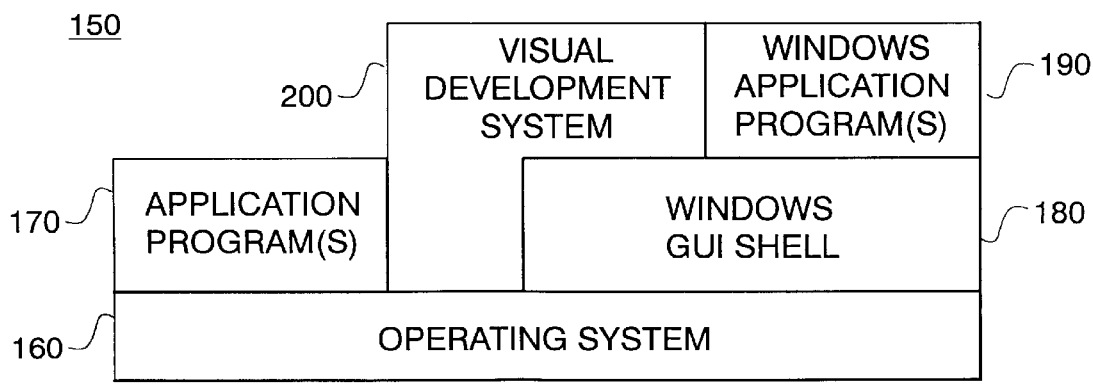
FIG. 1B is a block diagram of a software system provided for directing the operation of the computer system of FIG. 1A.

Illustrated in FIG. 1B, a computer software system 150 is provided for directing the operation of the computer system 100. Software system 150, which is stored in system memory 102 and/or on disk storage 107, includes a kernel or operating system (OS) 160 and a windows shell or interface 180. One or more application programs, such as application programs 170 or windows application programs 190, may be "loaded" (i.e., transferred from storage 107 into memory 102) for execution by the system 100. OS 160 and shell 180, as well as application software 170, 190, include an interface for receiving user commands and data and displaying results and other useful information. Software system 150 also includes a visual development system 200 of the present invention for developing system and application programs. As shown, the development system 200 includes components which interface with the system 100 through windows shell 180, as well as components which interface directly through OS 160.

In a preferred embodiment, operating system 160 includes MS-DOS and shell 180 includes Microsoft® Windows, both of which are available from Microsoft Corporation of Redmond, Wash. Alternatively, components 160 and 180 can be provided by Microsoft Windows 9x/Windows NT. Those skilled in the art will appreciate that the system may be implemented in other platforms, including Macintosh, UNIX, and the like. Application software 170, 190 can be any one of a variety of software applications, such as word processing, database, spreadsheet, text editors, and the like, including those created by the development system 200, which is now described in greater detail.

C. Development System

Figure 2:
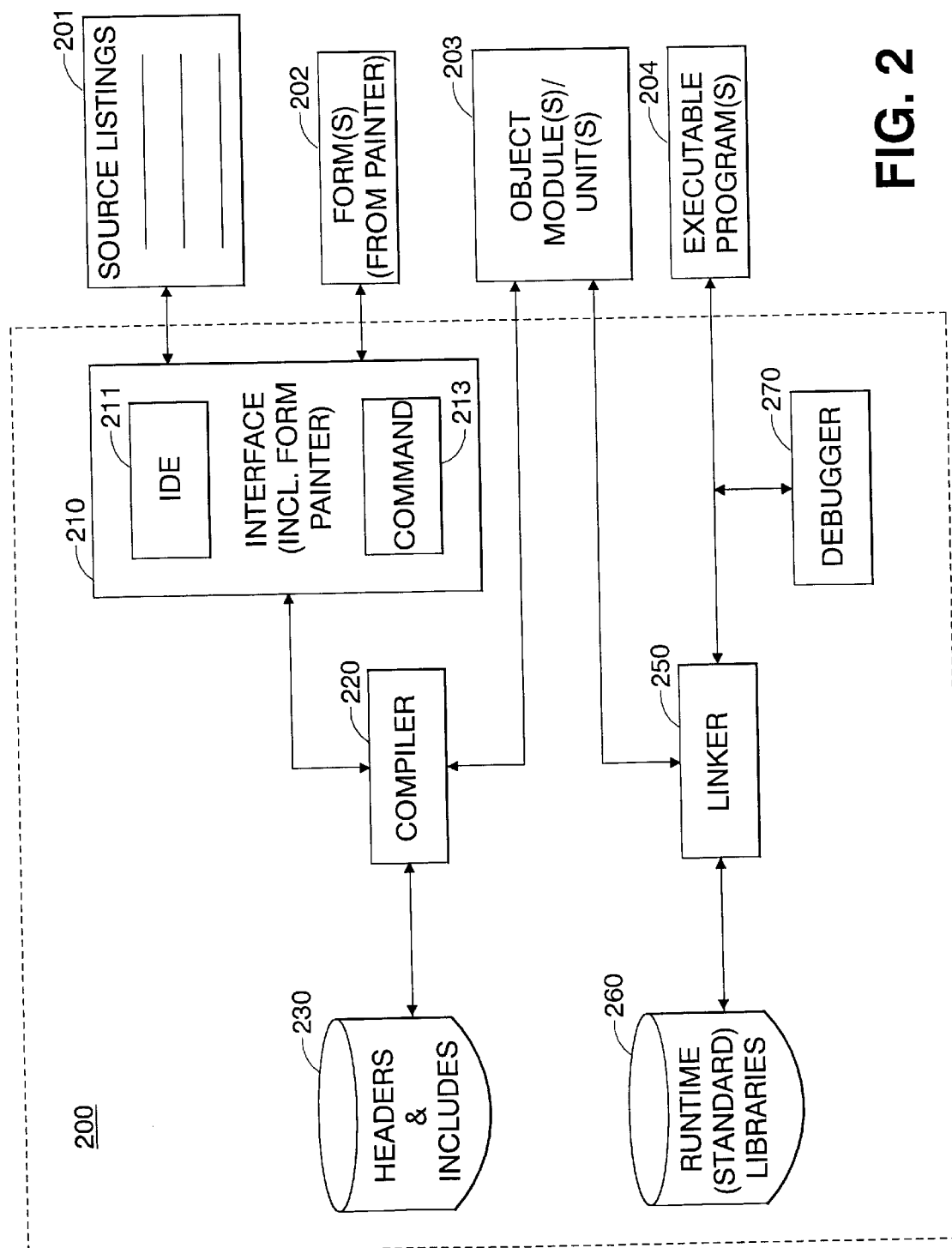
FIG. 2 is a block diagram of a visual development system of the present invention which includes a compiler, a linker, and an interface.

Shown in further detail in FIG. 2, the visual development system 200 of the present invention includes a compiler 220, a linker 250, an interface 210, and (optional) debugger 270. Through the interface, the developer user "paints" forms 202 with objects and supplies source listings 201 to the compiler 220. Interface 210 includes both command-line driven 213 and Integrated Development Environment (IDE) 211 interfaces, the former accepting user commands through command-line parameters, the latter providing menu equivalents thereof. From the source code or listings 201, forms 202, and headers/includes files 230, the compiler 220 "compiles" or generates object module(s) or "units" 203. In turn, linker 250 "links" or combines the units 203 with runtime libraries 260 (e.g., standard runtime library functions) to generate program(s) 204, which may be executed by a target processor (e.g., processor 101 of FIG. 1A). The runtime libraries 260 include previously-compiled standard routines, such as graphics, I/O routines, startup code, math libraries and the like.

A description of the general operation of development system 200 is provided in the manuals accompanying Delphi™: Users Guide (Part No. HDA1330WW21770), and Developer's Guide (Part No. HDA1330WW21772). Further description can be found in Object Pascal Language Guide (Part No. HDA1330WW21771) and Visual Component Library Reference, Volumes 1 and 2 (Part Nos. HDA1330WW21773, HDA1330WW21774). The disclosures of each of the foregoing (which are available directly from Borland International of Scotts Valley, Calif.) are hereby incorporated by reference. Description of the use of "method pointers" in the system, for implementing event handling, can be found in the commonly-owned, co-pending application entitled DEVELOPMENT SYSTEMS WITH METHODS FOR TYPE-SAFE DELEGATION OF OBJECT EVENTS TO EVENT HANDLERS OF OTHER OBJECTS, U.S. patent application Ser. No. 08/594,928, filed Jan. 31, 1996, the disclosure of which is hereby incorporated by reference.

Operation (i.e., "compilation") by a compiler, such as compiler 220, is generally driven by its two main components: a front end and a back end. The "front end" of the compiler parses the source program and builds a parse tree—a well known tree data structure representing parsed source code. The "back end" traverses the tree and generates code (if necessary) for each node of the tree, in a post-order fashion. For an introduction to the general construction and operation of compilers, see Fischer et al., Crafting a Compiler with C, Benjamin/Cummings Publishing Company, Inc., 1991, the disclosure of which is hereby incorporated by reference. Further description of the back end of the compiler is provided in commonly-owned U.S. Pat. No. 5,481,708, issued Jan. 2, 1996. Description of a linker, such as Borland's TurboLinker, is provided in commonly-owned U.S. Pat. No. 5,408,665, issued Apr. 18, 1995. The disclosures of each of the foregoing patents are hereby incorporated by reference.

D. General development interface

Figure 3A:
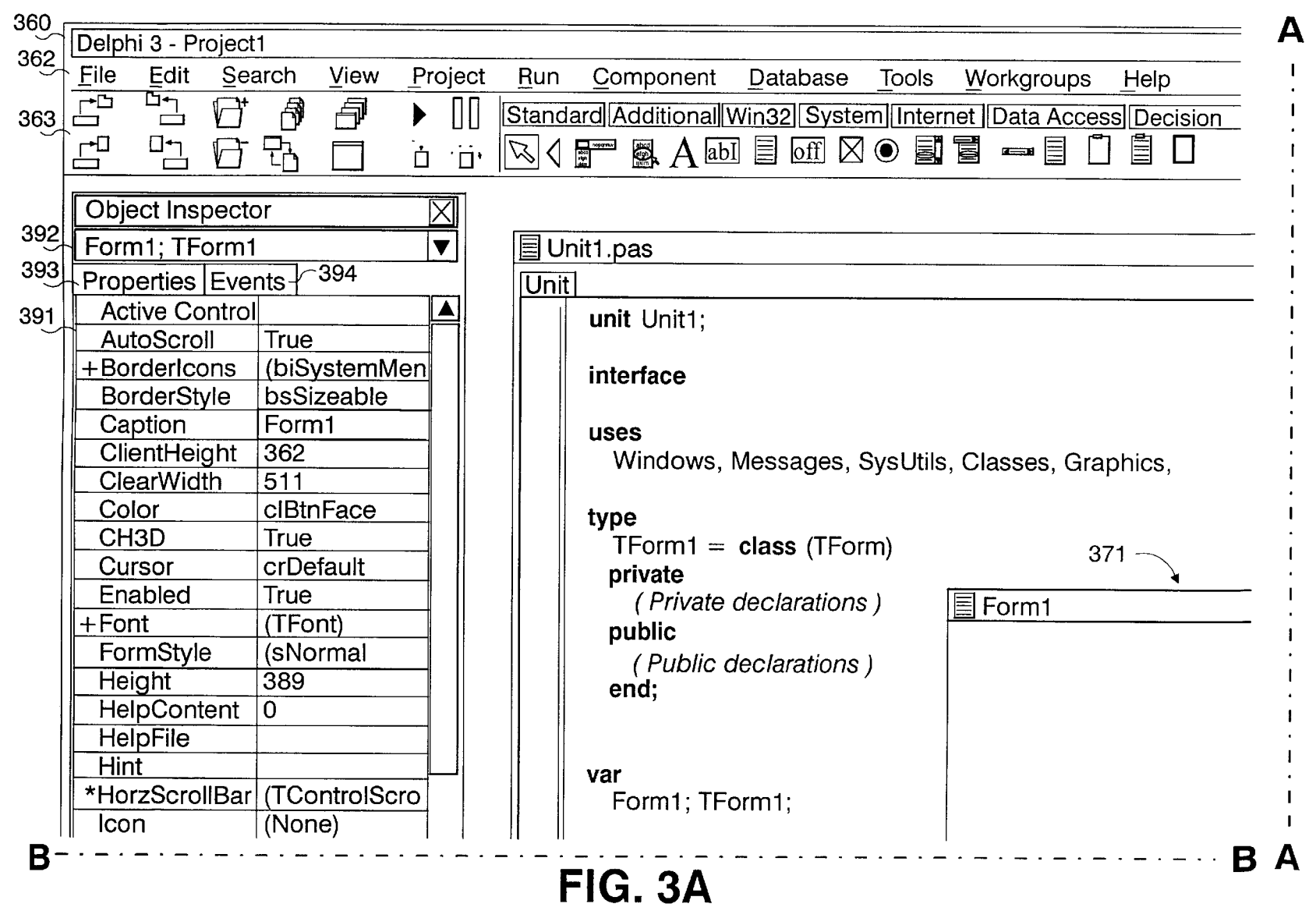
Figure 3B:
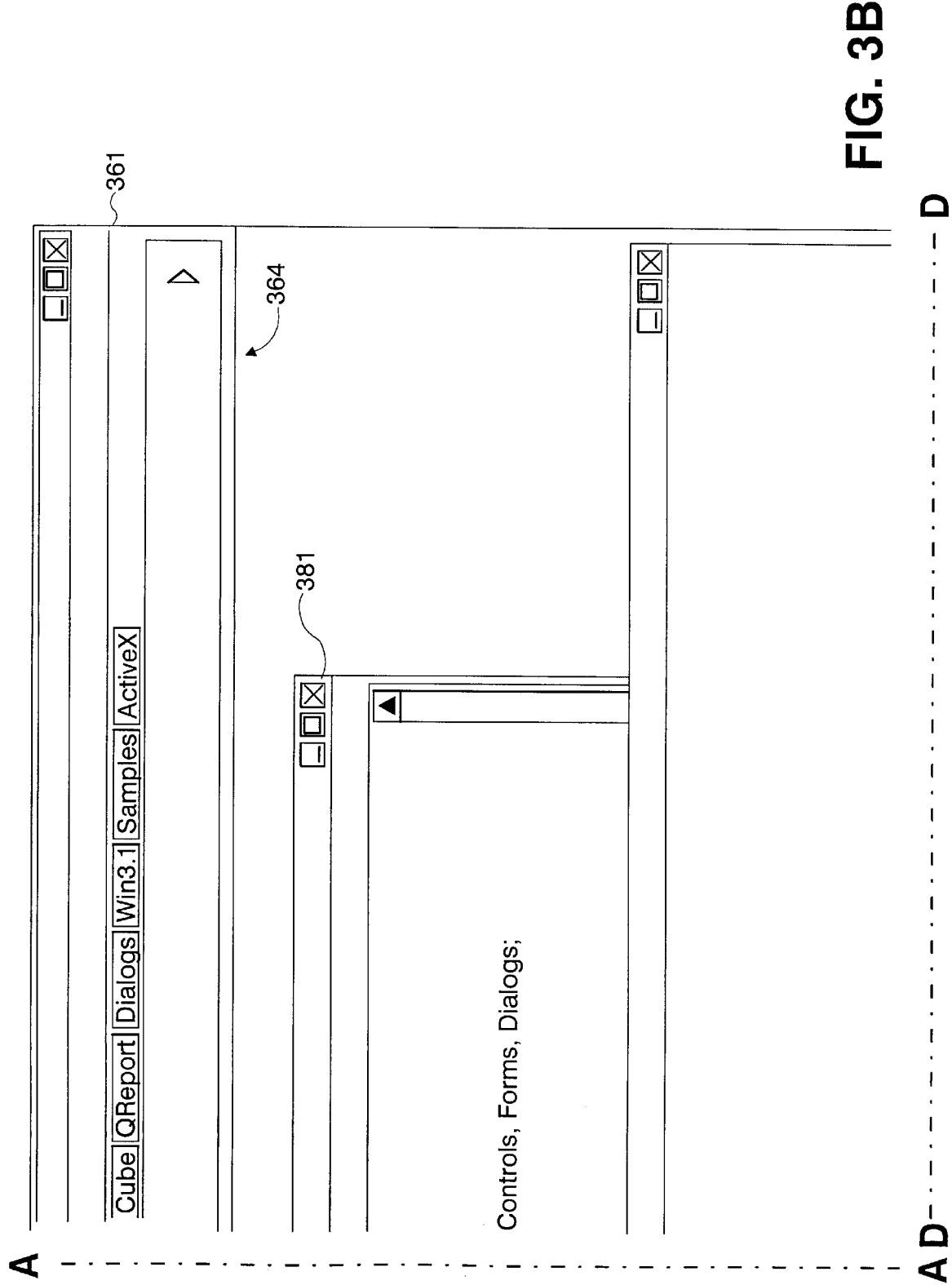
Figure 3C:
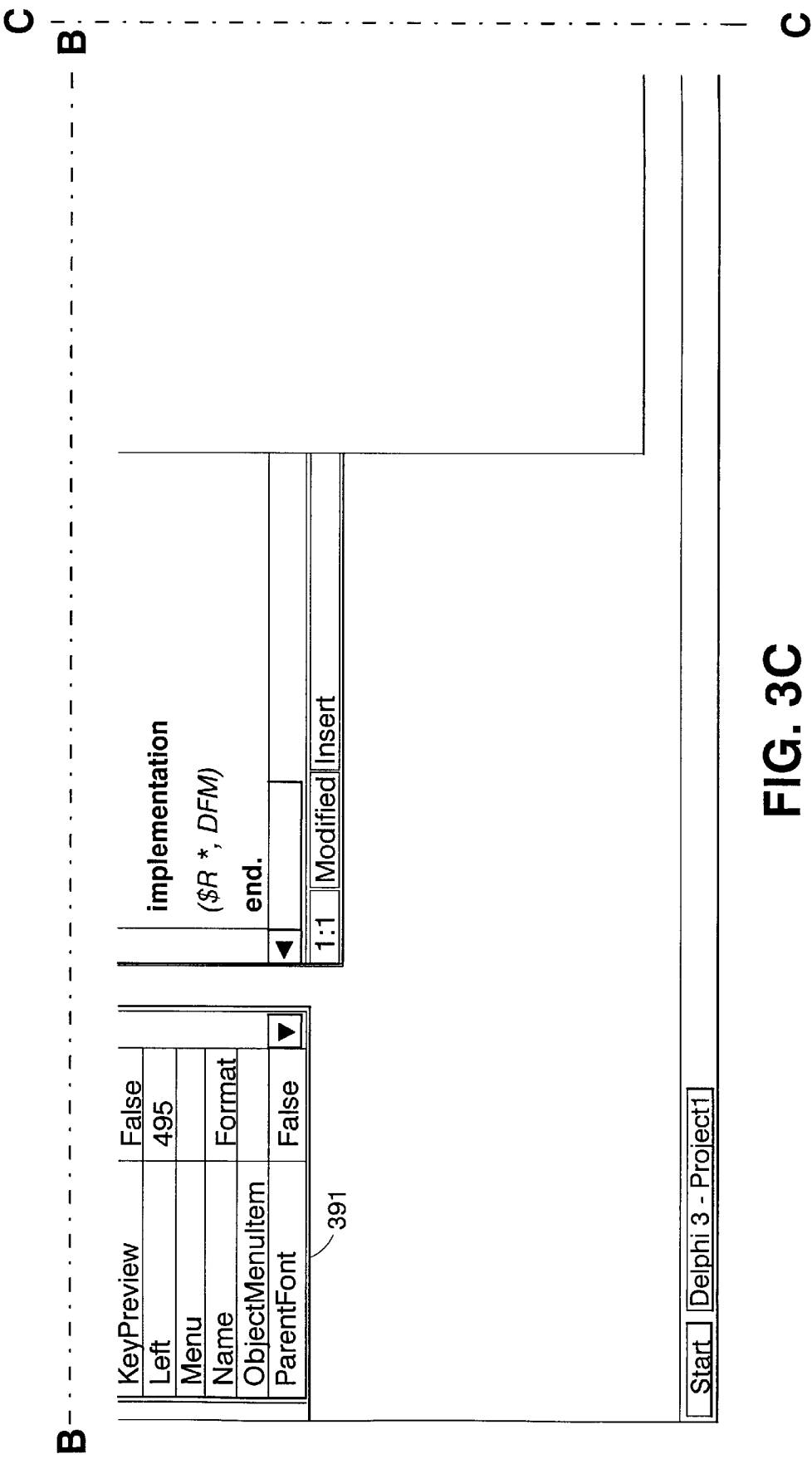
Figure 3D:
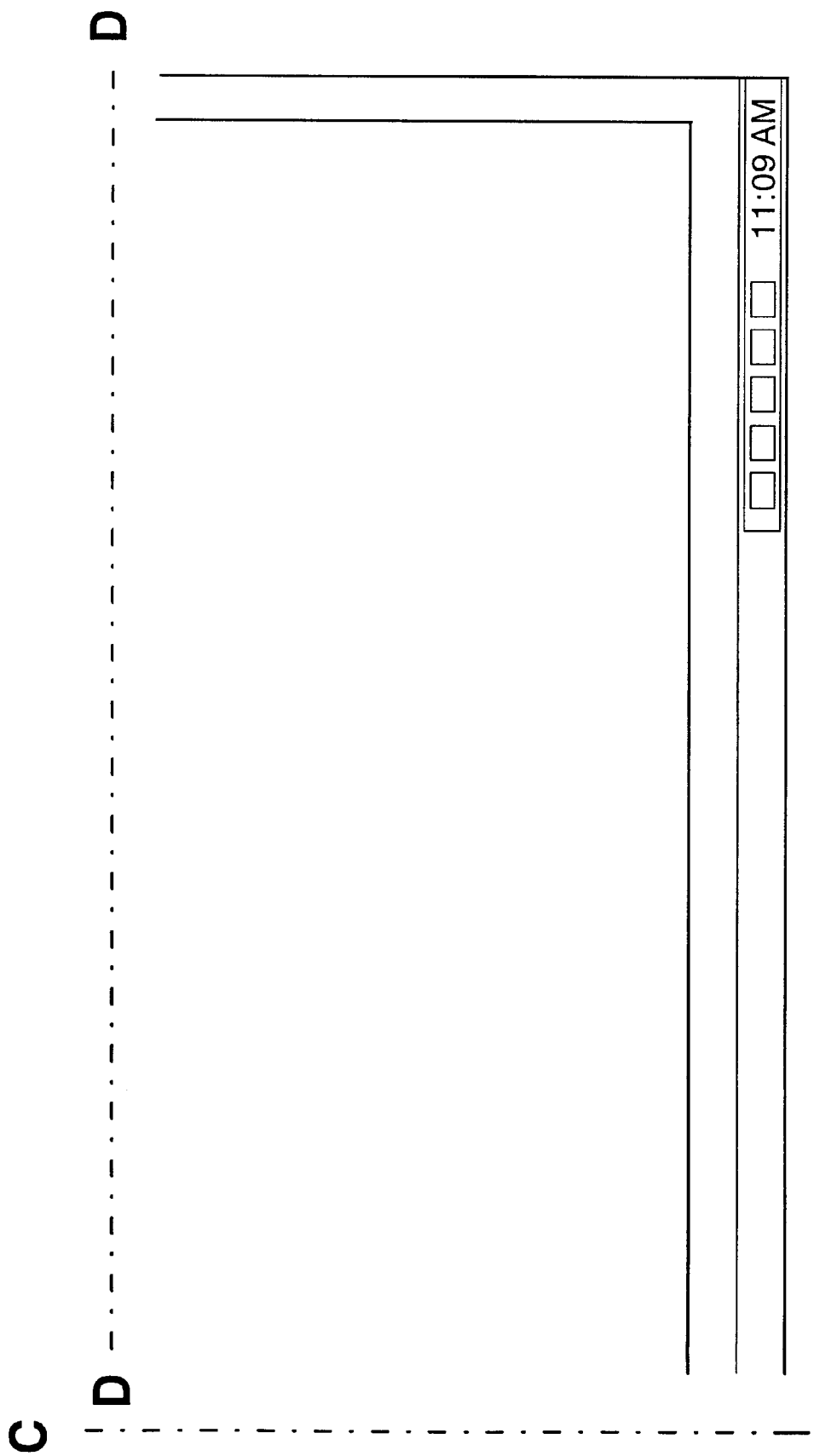
Figure 4A:
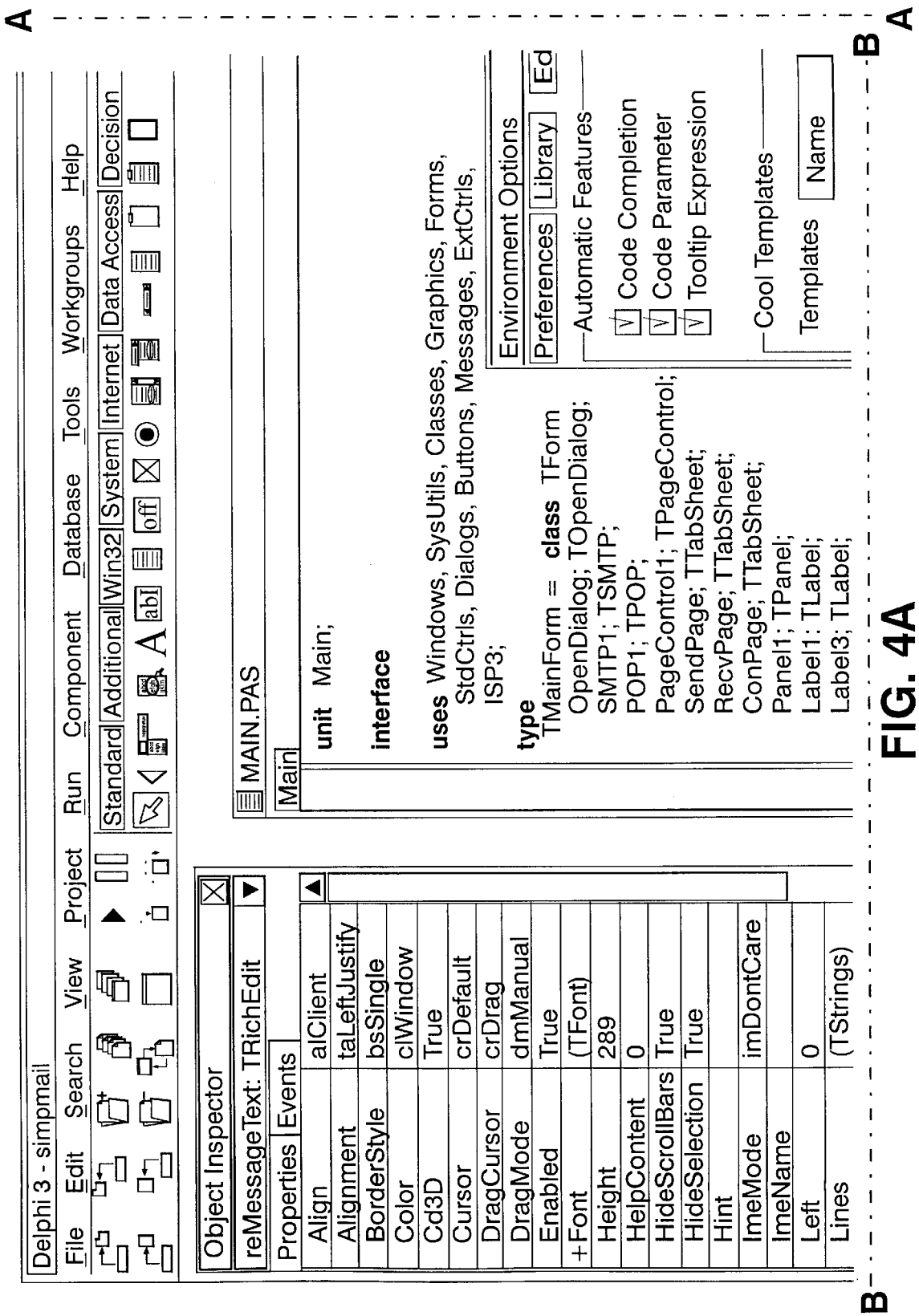
FIGS. 4A–D are together a screen shot illustrating an Environment Options dialog box, for configuring operation of "Code Insight" features of the system.
Figure 4B:
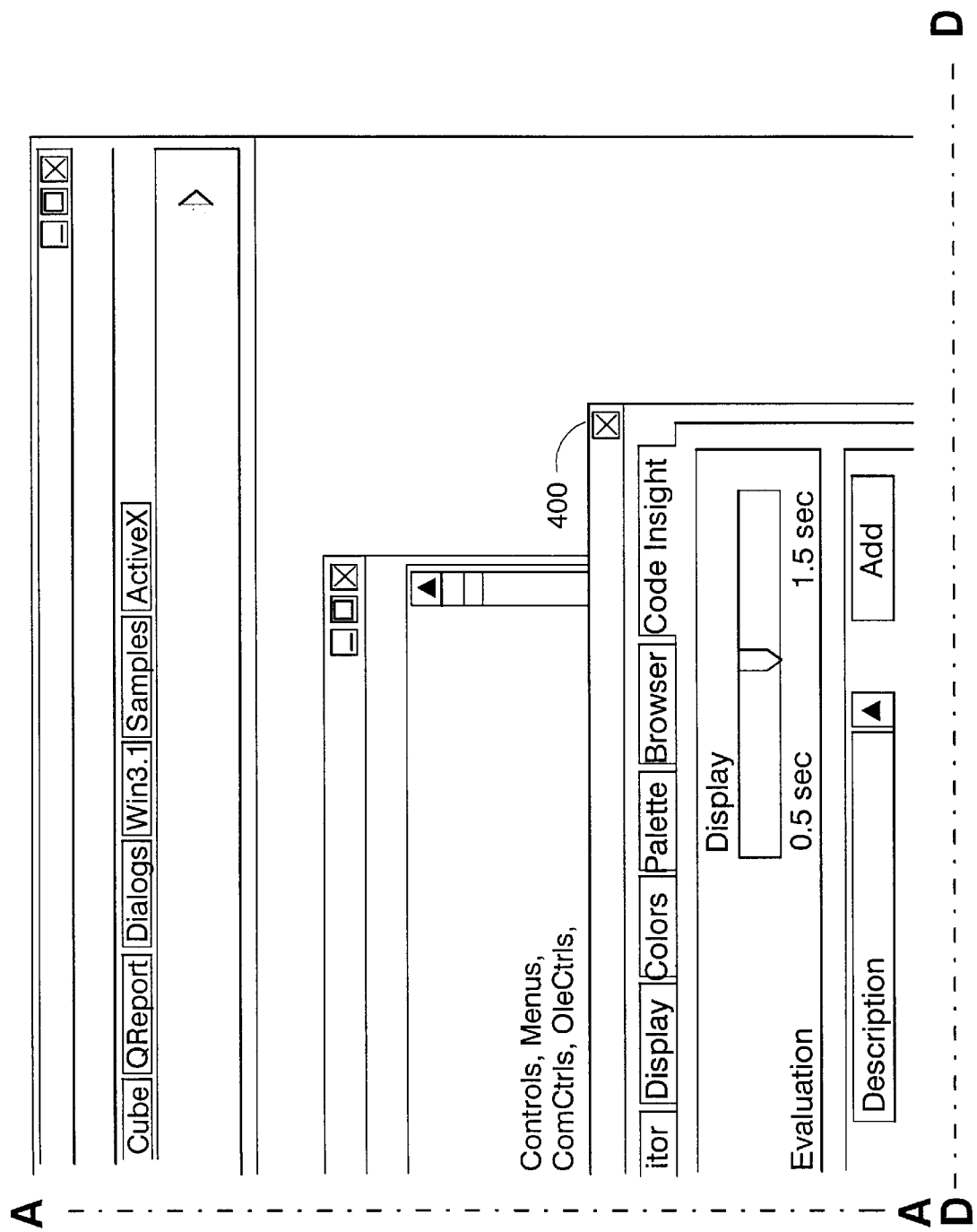
Figure 4C:
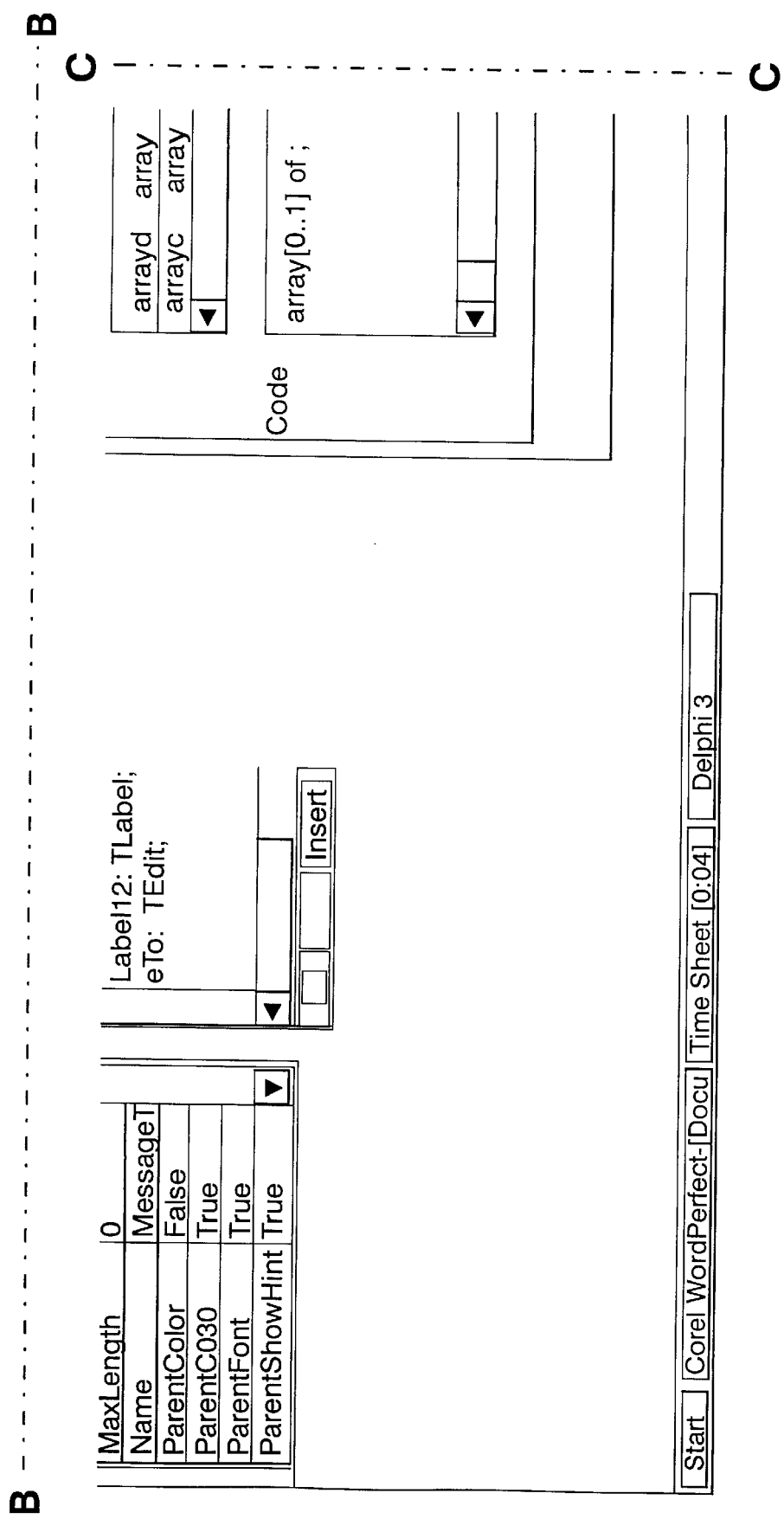
Figure 4D:
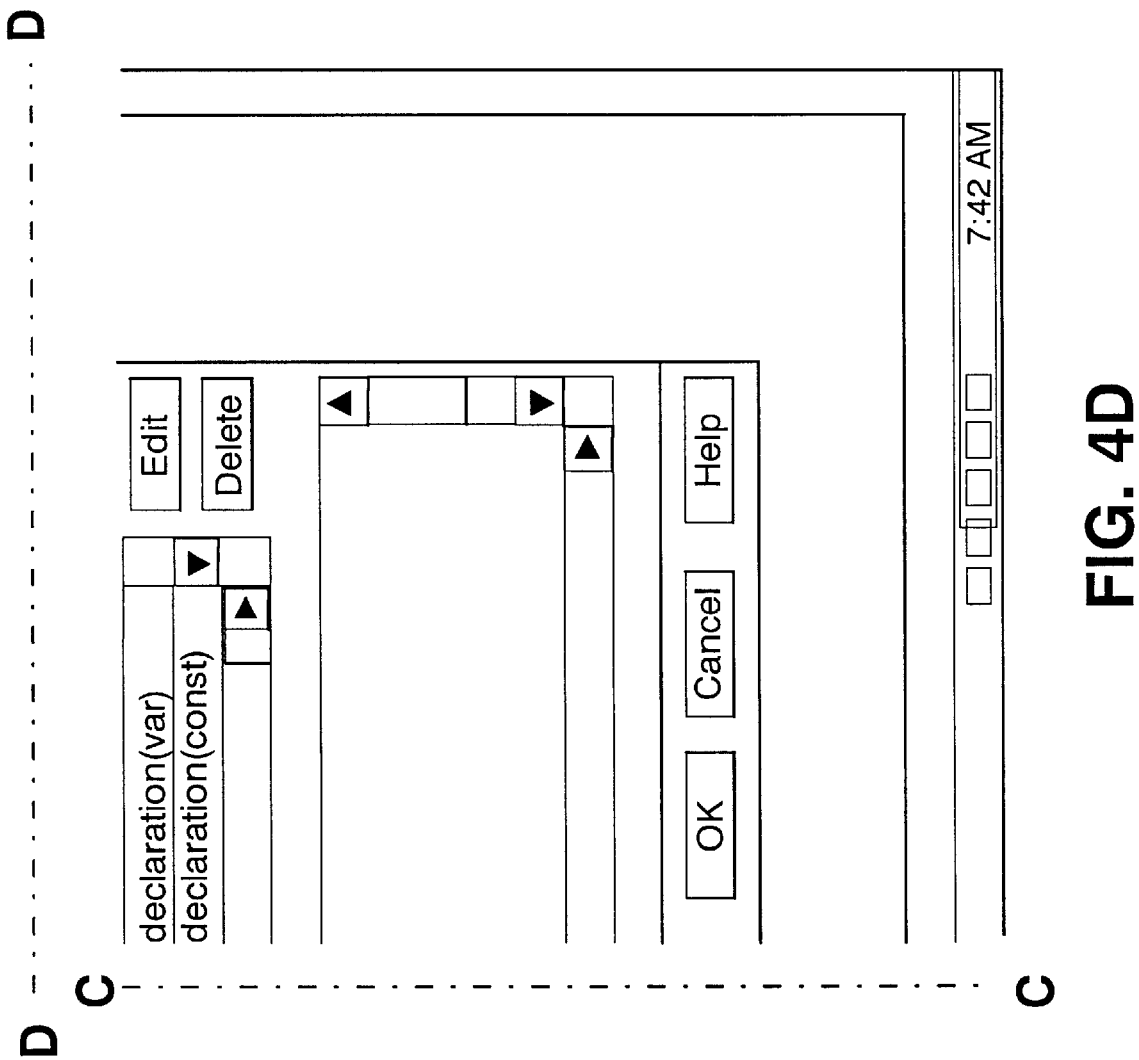

The present invention is embodied in Delphi™, a component-based, rapid application development (RAD) environment available from Borland International of Scotts Valley, Calif. FIG. 3 illustrates an application development environment 360, which is provided by Delphi. Many of the traditional requirements of programming, particularly for Windows applications, are handled for the programmer automatically by Delphi.

As shown, the programming environment 360 comprises a main window 361, a form 371, a code editor window 381, and an object manager or "inspector" window 391. The main window 361 itself comprises main menu 362, tool bar buttons 363, and component palette 364. Main menu 362 lists user-selectable commands, in a conventional manner. For instance, the main menu invokes File, Edit, View submenus, and the like. Each submenu lists particular choices which the user can select. Working in conjunction with the main menu, toolbar 363 provides the user with shortcuts to the most common commands from the main menu. The toolbar is configurable by the user for including icons for most of the menu commands.

Forms, such as form 371, are the focal point of nearly every application which one develops in the environment. In typical operation, the user employs the form like a canvas, placing and arranging "components" on it to design the parts of one's user interface. The components themselves are the basic building blocks of applications developed within the environment. Available components appear on the component palette 364, which is displayed as part of the main window 361. The form can be thought of as a component that contains other components. One form serves as the main form for the application; its components interact with other forms and their components to create the interface for an application under development. In this manner, the main form serves as the main interface for an application, while other forms typically serve as dialog boxes, data entry screens, and the like.

During "design" mode operation of the system, the user can change the properties of the form, including resizing the form and moving it anywhere on screen. The form itself includes standard features such as a control menu, minimize and maximize buttons, title bar, and resizeable borders. The user can change these features, as well as other "properties" of the form, by using the object inspector window 391 to edit the form during design time. Thus, properties define a component's appearance and behavior.

Components are the elements which a user employs to build his or her applications. They include all of the visible parts of an application, such as dialog boxes and buttons, as well as those which are not visible while the application is running (e.g., system timers). In the programming environment 360, components are grouped functionally on different pages of the component palette 364. Each functional group is identified by a tab member, which includes a label indicating the particular nature of the group. For example, components that represent the Microsoft Windows common dialog boxes are grouped on the "Dialogs" page of the palette. The palette can incorporate user-created custom controls, which the user installs onto the palette. Additionally, the user can install third-party components.

The object inspector window 391 enables the user to easily customize the way a component appears and behaves in the application under development. The inspector 391 comprises an object selector field 392, a properties page 393, and an events page 394. The object selector 392 shows the name and type of the currently selected object, such as "Form1," as shown. The properties page 391 lists the attributes of a component placed on a form (or the form itself) which can be customized. The events page, on the other hand, lists "event handlers" for a particular component. Event handlers are specialized procedures which may include user-provided program code.

Code editor 381 is a full-featured editor that provides access to all the code in a given application project. In addition to its basic editing functionality, the code editor 381 provides color syntax highlighting, for assisting the user with entering syntactically-correct code. When a project is first opened, the system automatically generates a page in the code editor for a default unit of source code; in the Object Pascal preferred embodiment, the default unit is named Unit1.

The following description will focus on those features of the development system 200 which are helpful for understanding methods of the present invention for implementing code completion in a visual development environment.

Methods for Assisting a User with Input of Source Code

A. User interface operation

The IDE provides "Code Insight" features to the code editor for displaying context sensitive pop-up windows within a source code file. By default these features are enabled. To disable/re-enable and configure the features, the user invokes (selects Tools|Environment) an Environment Options dialog box 400, as shown in FIG. 4.

As shown, Code Insight provides several features, which generally function as follows.

| Feature | Use and functionality |
| --- | --- |
| Code Completion | Enter a class name followed by a period in a code file. The list of properties, methods and events appropriate to the class will be displayed. The user can then select the item to be entered in the code. Enter an assignment statement and press <ctrl> <spacebar>. A list of arguments that are valid for the variable is displayed. Select an argument to be entered in the code. |
| Code Parameters | View the syntax of a method as the user enters it into the code. |
| Tooltip Expression Evaluation | When the compiler is stopped during debug, the user can view the value of a variable by pointing to it with the cursor. |
| Code Completion Delay | Set the duration of the pause before a Code Insight dialog box is displayed. |
| Code Templates | Available templates are listed by name with a short description. Click a template name to display the code that will be entered in the file when that template is selected. Code displayed in the code window can be edited. |
| Templates | The Templates box includes a name and short description for each template. |
| Code | The code box displays the code that will be inserted into a file when the template is selected. The code displayed can be edited. |

Of particular interest herein are the Code Completion and Code Parameter features.

Figure 5A:
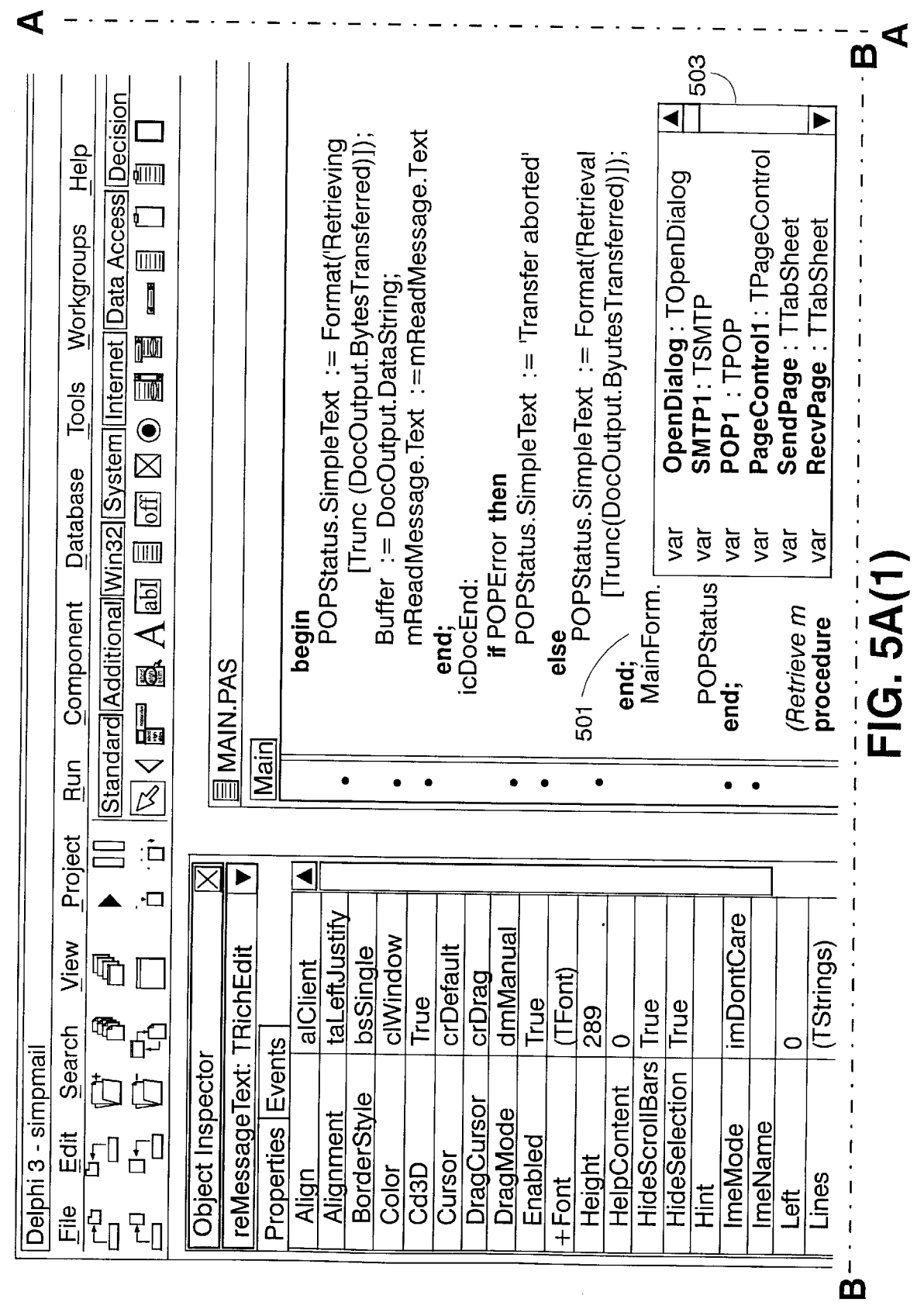

Code Completion is implemented at the user interface level by displaying a Code Completion dialog box after the user enters a record or class name followed by a period. For a class, the dialog lists the properties, methods and events appropriate to the class. For a record or structure, the dialog lists the data members of the record. As shown in FIG. 5A, for instance, at 501, the user has begun entry of MainForm, a class of type TMainForm. Upon the user's input of the dot operator, the system automatically displays list dialog 503 next to the current cursor position. Dialog 503 lists the properties, methods and events appropriate to the class. To complete entry of the expression, the user need only select an item from the dialog list, whereupon the system automatically enters the selected item in the code.

In a like manner, FIG. 5B illustrates Code Completion for a rectangle structure, TRect. Here, the user has declared a variable, myRect, of type TRect. The TRect type defines a rectangle as follows.

TRect=record
  case Integer of
    0: (Left, Top, Right, Bottom: Integer);
    1: (TopLeft, BottomRight: TPoint);
end;
where TPoint is itself a record defined as follows.
TPoint=record
  X: Longint;
  Y: Longint;
end;

In FIG. 5B, upon the user's input of the dot operator, the system automatically displays list dialog 513 next to the current cursor position 515. Dialog 513 lists the data members appropriate to the record (structure). Again, the user need only select an item from the dialog list to complete entry of the expression, whereupon the system automatically enters the selected item in the code.

Code Completion also operates during input of assignment statements. As illustrated in FIG. 5C, when the user enters an assignment statement for integer variable J and presses a hot key (e.g., <ctrl><space_bar>) at 525, a list of arguments 523 valid for the variable is displayed. Here, the user can simply select an argument to be entered in the code. As shown in FIGS. 5D–E, the user can select a type which itself is not appropriate (e.g., record type) but nevertheless includes a nested data member having a type which is valid. In FIG. 5D, the user selects type variable SMTP1, a structure of type TSMTP, at 531. Upon the user entering the dot operator after SMTP1, the system displays a list of the data members for SMTP1, as shown at 541 in FIG. 5E. Now, the user can simply select a valid argument to be entered in the code.

In a like manner, the user can bring up a list of arguments when typing a procedure, function, or method call and needs to add an argument. In FIG. 5F, for instance, the user has begun entry of a SendFile method call. The SendFile method itself is defined elsewhere in the code as follows.
procedure SendFile(Filename: string);

Upon the user entering the opening parenthesis, the system automatically displays parameter information for the call. The syntax for the argument(s) to the method is displayed, as shown at 551 in FIG. 5F. In this manner, the user can view the required arguments for a method as he or she enters a method, function, or procedure call.

B. Overview of internal operation

During basic operation, the Integrated Development Environment or IDE invokes the compiler for determining an appropriate context for the source code, based on where the screen cursor is currently positioned within the code. The compiler, in response, compiles the source code up to the current point (of the user's cursor) and then returns a result back to the IDE which describes the current context within the source code. The IDE receives two core pieces of information. If the user has positioned the cursor within the parameter list of a function call, the IDE will receive information from the compiler reporting the name of the function together with the name and the types of the function's formal parameters. With this information, the IDE can display a pop-up menu providing an argument list for the current function, thus eliminating the need to invoke a help system for looking up the function.

The second type of information which the IDE receives relates to symbols or identifiers. If a symbol or identifier would be valid at the current cursor position, the compiler will identify the condition and prepare a list of the valid identifier, together with other valid identifiers, for the cursor position. The IDE, upon receiving this information, can display the list to the user. The user, in turn, selects the desired symbol from the list, for instance using incremental searching technique.

As an example of this feature, consider for instance a variable name followed by the dot operator (e.g., MyRecord.). Here, a member name is expected (e.g., MyRecord.Foo). Accordingly, the compiler will compute and report the members of the structure (of the variable) which meet any conditions or constraints of the code at the cursor position. If an integer type is expected, for instance, the compiler here would only report integer members. The determination of an appropriate type is based on legal constructs which can be created at the then-current cursor position. In an expression comprising a floating-point assignment, both floating-point and integer data types are valid. Accordingly, both floating-point and integer data members would be displayed for user selection.

The approach also takes into account nested members. Continuing with the example of an integer data type, one of the data members might be a rectangle structure (e.g., a structure of type RECT) which, in turn, comprises integer data members (i.e., nested data members). In this situation, the system displays the rectangle (nested structure) member since there is a legal way to employ integer data members of that structure. For this example, the user will ultimately need to type an additional dot (i.e., dot operator) to complete selection of the final data member.

C. Core internal methods

The core functionality is provided as follows. A first method, CompilerKibitz, is invoked by the IDE to trigger compilation. In invoking the method, the IDE passes in the filename (i.e., source code filename), together with the current line number and column position where the cursor is located. In an exemplary embodiment, the method may be constructed as follows (using the C programming language).

```
void EXPORT CompilerKibitz(CompOptions *options,
            UnitNameFileNamePair *unitFileNamePairs,
            const char *stopSrc, int stopLine, int stopCol,
            char makeFlag, KibitzResult *result)
{
    //...
    /* Parse source up to stopSrc, stopLine and stopCol and report the
       result. source and stopSrc will be the same except for
       include files. */
    /*
    Two main pieces of information:
    - Are we currently in a call to a user-defined or standard procedure,
      function, or method? If so, what's the name of the procedure and the
      parameter list. What are the positions of the actual parameters so far?
      (This information is recorded directly in the result record in part;
      however, the IDE has to call back for more information.)
    - If a symbol was expected at the cursor position, what is the list of
      symbols that would make sense at this point? For this
      information, a GetValidSymbols method or function is invoked
    */
    //...
}
```

As shown, the method is invoked with seven parameters. The first parameter, a pointer-to compiler options (CompOptions), is a structure which specifies a "source to compile"; this might be different than the source which the IDE desires the compiler to stop. The file can be specified in a conventional manner, such as by filename (text string). The second parameter is a pointer-to unit/file name pairs. This, in essence, is a table of unit name/file name associations. This is passed to the compiler since the IDE might have some knowledge about where particular files are located (on disk) for corresponding "units" which are included in the user's project. In a Borland Delphi™ program, for instance, a "uses" statement sets forth particular Pascal "units" which are employed. Since the IDE stores directory information for various files (e.g., library files), the IDE can pass such information on to the compiler via the second parameter.

The next three parameters specify the user's source position. The stopSrc parameter is a (pointer to) character string specifying the "stop source"—that is, the current source file where the user has stopped (i.e., stopped data entry long enough to invoke the code completion methodology of the present invention). The stopLine parameter is an integer data member storing the particular line number where the user stopped in the source code. Similarly, stopCol is an integer data member specifying the particular column in the source code where the user stopped.

Finally, the makeFlag parameter serves as a flag indicating that the compiler should "make" the program (i.e., compiling all dependent source files for ensuring that the currently-compiled unit or project is up-to-date). This is set to "true" when the IDE has detected that other files have been added, thus requiring a "make." If, on the other hand, other files have not been added, the flag is set to false and only the current source file is compiled. The last parameter is a pointer to a "Kibitz" result structure, KibitzResult. After completion of the method execution, the result structure still does not contain a list of valid symbols. Instead, the IDE invokes yet another method to fill out this particular information in the result structure.

To obtain the actual list of valid symbols, the IDE invokes a GetValidSymbols method. The method includes the following prototype.

```
int EXPORT GetValidSymbols(const KibitzResult *k, Symbol **result,
            GF_Flags *flags, int maxCnt)
{
    /* Find symbols valid in this context. Find up to maxCnt, and report
       how many were found. Write them into result, if result <> 0. */
}
```

As shown, the method is invoked by passing in (by reference) the KibitzResult structure, as the method's first parameter. Together with the result structure, a vector of symbols is passed in as the second parameter and a vector of flags is passed in as the third parameter. Finally, a maximum count is specified in the fourth parameter, for indicating an upper limit on the number of symbols which should be returned (i.e., based on how many the IDE can realistically handle). During system operation, the IDE invokes the GetValidSymbols method twice. On the first invocation of the method, the IDE simply specifies NULL for the two vectors whereupon the method returns a count for the number of valid symbols. Based on this first call, the IDE will allocate sufficient memory and then invoke the GetValidSymbols method a second time, passing in appropriate pointers to the allocated vectors which are to store the symbol results.

D. KibitzResult data structure

The result data structure, KibitzResult, may be defined as follows.

```
typedef   struct
{
    KibitzKind    kind;
    Unit          *unit;
    int           scopeCnt;
    Symbol        *scopeList [MAXSCOPES/*scopeCnt*/];
    Symbol        *proc;             // valid for KK_ARGUMENT and KK_STD_ARG
    Symbol        *formalArg;        // valid for KK_ARGUMENT
    int           formalInx;         // valid for KK_STD_ARG, 1-based
    unsigned      validTypes;        // valid for KK_TYPE, KK_STD_ARG
    Type          *validType;        // valid for KK_EXPR, KK_CONST_EXPR
    Token         validToken;        // valid for KK_TOKEN
    TokenClass    validTokens;       // valid for KK_TOKENS
    Kibitzpos     pos;               // position of kibitz point
    char          partialInden[64];  // may have found a partial identifier
    // KK ARGUMENT: where the parms were; [0] <=> '(' | '[' pos
    LineCol       paramPos [MAXPARAMS + 1];
} KibitzResult;
```

As shown, the data structure is a record storing context information. Of the various data members of the record, the most important is KibitzKind, an numerated type indicating the "kind" of source code situations the system is currently in. The KibitzKind data type is itself defined as follows.

```
typedef   enum
{
    KK_NONE,              // Not something we support
    KK_FIELD,             // A field of a record/object/class
    KK_ARGUMENT,          // An actual argument to a user-declared
                          // function or procedure
    KK_STD_ARC,           // An actual argument to a standard
                          function/procedure
    KK_TYPE,              // A type
    KK_EXPR,              // An expression
    KK_STMT,              // A stmt
    KK_CONST_EXPR,        // A constant expression
    KK_TOKEN,             // A token
    KK_TOKEN_CLASS,       // A set of tokens
    KK_PROC_DECL,         // A procedure, function, method,
                          constructor,
                          // or destructor declaration
    KK_ERROR,             // Error case where we don't have
                          enough info
    KibitzKinds,
}   KibitzKind;
```

Two simple types are KK_NONE and KK_ERROR. KK_NONE indicates that the cursor is currently positioned at a location where code completion is not supported, such as positions within a user's comment. KK_ERROR, on the other hand, indicates an error condition; this occurs when the user's program contains so many errors that the system cannot correctly determine appropriate code completion. The KK_FIELD data type indicates a field of a record (structure), object, or class. For instance, if the user types Form1, a field member of Form1 is expected. KK_ARGUMENT indicates that the system expects an actual argument to a user-declared function or procedure. Here, further restrictions can be imposed. If the argument is a var argument, then the argument must be a variable. If, on the other hand, the argument is a value, then an expression is acceptable.

KK_STD_ARG indicates that an actual argument to a compiler-defined, standard function/procedure is expected. Since such functions or procedures have special requirements, the system treats them separately. KK_TYPE indicates that the system expects a "type," such as within a declaration statement. KK_EXPR indicates that an expression is expected. KK_STMT indicates that a statement is expected—that is, the system expects any valid identifier which can start a statement. Here, both a variable or procedure would be acceptable, for instance. KK_CONST_EXPR indicates that a constant expression is expected. This is typically employed for declarations, such as for string declarations. A type expression can be applied here, such as for indicating that an integer expression is required. KK_TOKEN and KK_TOKEN_CLASS indicate that the compiler is expecting a token or a particular type or class of token, respectively. In Borland Delphi™ (using Object Pascal), for instance, when an "if" token followed by a boolean expression is encountered, the compiler then expects a "then" token. KK_PROC_DECL indicates a procedure (function, method, or the like) declaration. In such a case, the system can display a list of all such procedures, functions, or methods which were forward declared.

Returning to the description of the KibitzResult structure, the second data member is unit. The unit data member points to a data structure (internal to the compiler) which represents the unit, as compiled by the compiler. This is followed by a scope count, scopeCnt, and a scope list, scopeList, for representing the available scopes at this particular point in the source code. For instance, when the user starts a statement within a procedure, all of the local symbols of the procedure represent one scope. If the procedure is in fact a class method, then all of the fields of "self" (i.e., of the "self" hidden parameter) would represent another scope. The symbols of the unit would represent still yet another scope. Still further, there are symbols of other units which the current unit employs giving rise to yet another scope. The scope count and scope list keep track of which of these scopes are available at a given point in the source (where the cursor is positioned). This information is ultimately used by the GetValidSymbols method which "walks" the scope list for determining the valid symbols for the current source position under exam.

The next data member, proc, is a pointer to a procedure symbol which is employed when the system is processing a call. The formalArg data member is a symbol pointer which points to the formal argument which the cursor is currently positioned at. For a function having three arguments, for example, the cursor could be positioned at the second argument. The next data member or field,formalInx, is an integer data member providing an index into the formal arguments. The validTypes data member is an internal encoding of the compiler which keeps track of which types will be valid at this point (in the source code). In the cases where the system expects an expression, such as an assignment into a variable, the pointer to validType references the valid type for the variable.

The next two data members, validToken and validtokens, keep track of the expected tokens and token class. A token class represents a scenario where several tokens can be valid. The next data member, pos, represents the position where the user's cursor is positioned in the source code. The pos data member is implemented as a record or structure of type KibitzPos which may be implemented as follows.

```
typedef   struct
{
    short   fileIndex;
    short   lineNo;       // up to here idential to SourcePos
    short   columnNo;     // 1-based
} KibitzPos;
```

As shown, the KibitzPos structure specifies a file (via an index), a line number, and a column number.

The next data member of KibitzResult is partialIden, which is employed for instances where the system has found a partial identifier. Here, the IDE will employ the information to perform an incremental search of available identifiers for attempting to find a match. As its final data member, the KibitzResult structure includes a parameter position array, paramPos. This indicates the source position of the actual parameter for a function call.

E. UnitNameFileNamePair data structure

The UnitNameFileNamePair data structure may be constructed as follows.

```
typedef   struct
{
    uchar   *unitName;
    char    *unitFileName;
} UnitNameFileNamePair;
```

This data structure is employed to keep track of unit names (e.g., simple Pascal names in Borland Delphi™) and filenames (i.e., qualified by file directory and drive). The compiler employs this data structure for determining a filename (i.e., the name of a file on disk) which corresponds to a unit name encountered in the source code.

The system defines the following flags which are used when a list of identifiers are reported back from the compiler to the IDE, for keeping track of whether a particular identifier itself is acceptable or whether the identifier itself only has a field which would be acceptable.

```
typedef   enum
{
    GF_NORMAL    = 0x00,  //  Normal case
    GF_SCOPE     = 0x01,  //  Symbol was included because it
                          //  has a scope
    GF_METATOKEN = 0x02,  //  Symbol is a metatoken
                          //  (e.g. 'identifier')
} GF_Flags;
```

This information is employed by the IDE to make a "visual" distinction between the two cases. Consider, for instance, an assignment statement involving an integer variable, as follows.

```
var
    I, j : Integer;
    r : TRect;
begin
    I :=          // complete this statement
```

In the snippet above, I is an integer variable and, thus, the statement can be completed by assigning the integer j as follows.

I:=j;

Alternatively, the statement can be completed by assigning an integer member of r (which itself is a variable of type TRect). To indicate these two choices, the IDE displays a list showing j normally and showing r with an ellipsis appended to it. This informs the user that r is acceptable but that the user has to still complete the entry with a dot (for accessing a field of r). In this case, the GF_SCOPE would be set for r, indicating that it is acceptable but only because it has a field which is acceptable.

F. Token-based processing

The basic internal operation of the system is as follows. As an initial task, the system lexical analyzer has to take the source position that the IDE passed to it and transform it into a special token. In general compiler operation, the function of the lexical analyzer is to take source text and transform it into a stream of tokens. Consider the following code snippet.

if I=|0 then (where | represents cursor position)

In operation, the lexical analyzer converts the expression into a sequence of tokens, for instance as follows.

```
if I = | 0 then
(*
Tokens:
TK_IF
            TK_IDENT
            TK_EQUAL
                        TK_KIBITZ
*)
```

Here, "if" is represented by the TK_IF token, I is represented by the TK_IDENT (i.e., identifier) token, and so forth and so on. In accordance with the present invention, the scanner reports a special token, TK_KIBITZ, for marking the current cursor position. In this manner, the system is easily able to identify the cursor position in the stream of tokens.

Exemplary method steps for performing this operation are as follows.

```
/*
    Lexical analyser (scanner) delivers special token (TK_KIBITZ) at
    cursor position. The following method checks against stop line once
    per line, then sets special marker character in the line buffer.
*/
    void Scan(void)
    {
        switch       (GetNextInputChar())
        {
        case    '\n':
            scannerState. lineNum++;
            if  ( scannerState.lineNum == stopline
                && strcmp(scannerState.fileName, stopSrc) == 0)
            {
```

```
            /* set special character to mark stop position */
            lineBuffer[stopCol] = 0;
        }
        break;
    case 0:
        if  (scannerState.column == stopCol)
        {
            token.tok = TK_KIBITZ;    // insert special token
            break;
        }
    /* . . . */
```

As shown, the implementation comprises a "switch" statement over the next input character (i.e., from the source code stream). Two special cases are of interest. The first case of interest is a line feed character. Upon reaching such an input character, the system at this case arm checks whether the current line number and filename correspond to that specified for the "stop" source (i.e., the source file where the user's cursor is positioned). As shown above, the line number is examined first so that the system can perform an integer comparison first, before a more expensive string comparison is undertaken. In the event that the line number and source filename indicate that the current input character corresponds to the cursor position, the system proceeds to mark the current line (maintained in a line buffer) with a special character, such as zero (i.e., NULL).

After the line is marked, the system "switches" on subsequent input characters until it encounters the value of zero (i.e., the special character inserted above to mark the stop position). The system at this point confirms that this is the position of interest by comparing the current column (in the source stream) with the column from the IDE. If the current column is equal to the column where the system wishes to stop, then the system inserts the special token—TK_KIBITZ—that tells the parser to stop at this point. This method step of the scanner illustrates the transformation from a stop source, a stop line, and a stop column to a special token which instructs the parser where to stop.

The parser in turn compiles the source normally, including the declaration, until it encounters the special token. During this compilation, however, the parser will skip compilation of function bodies unless a particular function body contains the special token. For code completion, in accordance with the present invention, the code contained within function bodies (apart from a current function which the user cursor might be positioned within) is not relevant. Since function bodies are skipped, no code is generated for those function bodies and the background compilation for code completion, therefore, occurs quickly.

During processing, the parser maintains a stack of "kibitz" contexts. When the parser encounters a TK_KIBITZ token, it returns the context information back to the IDE. This is illustrated, for instance, by the following snippet.

```
variable := FooFunction( a, b, |
          ^ KK_EXPR, type of variable
                ^ KK_ARGUMENT, FooFunction
                    ^ Argument 3, formal parameter
```

Note:
Parser keeps stack of kibitz contexts (on the runtime stack, for a recursive decent parser), and returns the information back to the IDE when it finds the $TK_{13}$ KIBITZ token.

An exemplary method for skipping the body of functions, using the kibitz token, may be constructed as follows.

```
/*
    Parser parses declarations fully, tries to skip function bodies,
    suppresses code generation. Routine to skip keeps track of nesting of
    structured statements, returns TRUE if the function body was
    skipped, FALSE otherwise.
*/
static    int    SkipBody(void)
{
    int     nestLevel;
    long    startPos;
    startPos = ScannerPos();
    nestLevel = 0;
    while   (1)
    {
        switch       (token.tok)
        {
        case    TK_CASE:
        case    TK_TRY:
        case    TK_ASM:
        case    TK_INITIALIZATION:
        case    TK_BEGIN:       nestLevel++;    break;
        case    TK_END:         nestLevel--;    break;
        case    TK_EOF:         nestLevel = -1; break;
        case    TK_KIBITZ:
            ScannerSeek(startPos);
            Scan();
            return      FALSE;
        }
        if   (nestLevel < 0)
            break;
        Scan();
    }
    return    TRUE;
}
```

The SkipBody method is invoked when the parser detects the beginning of a function body. The method operates as follows. At the outset, the method remembers the current position, as storing it to startPos. Next, the method initializes a local variable, nestLevel, which serves to keep track of the nesting of structured statements. This is followed by a "while" loop which switches on token. In operation, the loop reads a token and then switches to a particular case arm based on token type. If the token type marks the beginning of a structured statement, the nestLevel countered is incremented. Conversely, if this token marks the end of a structured statement, nestLevel is decremented. If the method encounters the special "kibitz" token, it returns to the beginning of the function by invoking ScannerSeek. Thereafter, the method returns "false" as the method has not been skipped. After completing execution of the switch statement, the method can determine whether it has found the final end of the function.

In summary, the basic approach is to go through the function as fast as possible (i.e., look through the tokens of the function as fast as possible), keeping track of nesting. If the end is encountered, the method can return true. If, on the other hand, a special "kibitz" token is encountered, the method repositions the parser (scanner) to the beginning of the function and returns "false." In such a case, the parser will resume parsing forward as more detail about the function is required, since it is the function where the user's cursor is positioned.

G. Scopes

While parsing, the compiler keeps track of accessible scopes. For instance, when entering a particular statement, the parser enters a scope, and at the end of the statement the parser exits the scope. Scopes that are accessible include "with" scopes (i.e., Pascal with statements), local symbols of any current procedures the parser is within, the symbols of the current unit (i.e., symbols global to the unit), and symbols of any units employed by the current unit (i.e., imported symbols).

In order to handle method function calls directly, the parser maintains a stack of contexts which it is in. Just as the computer system stack must maintain a separate copy of local variables for each function invocation, the parser mirrors the approach so that it can keep track of the appropriate context. During parsing of a function call, for instance, when the parser encounters the left paren (i.e., opening parenthesis), the parser "pushes" onto its stack information indicating it is now parsing within the context of a function argument. When the parser has parsed the right paren (i.e., closing parenthesis), the parser "pops" the previously-pushed stack entry, for indicating that it is no longer within the context of function argument. If the function call occurred in an assignment statement, for instance, the context information would indicate at this point that the parser is popping back into the context of an expression. In the instance of nested function calls (e.g., recursion), the stack would contain entries for different argument contexts.

When in the context of an argument list for either a user-declared or standard function, the IDE employs ancillary or helper functions, to get information pertaining to the function and parameter symbols. Exemplary helper functions include the following (shown in function prototype form).

```
/*  In the case of KK_ARGUMENT or KK_STD_ARG, we are in a
    call to a user-declared or standard function, respectively. The IDE
    uses the information in the result record and the following compiler
    entry points to build a parameter list to show to the user:
*/
    int EXPORT GetSymbols(Symbol *root, SQ_Flags flags,
        Symbol **symList);
    /* used to get the parameters of a procedure/function/method */
    GSF_Flags EXPORT GetSymbolFlags (Symbol *sym);
    /* used to get information about parameter and function symbols */
    void EXPORT GetSymbolText(Symbol *sym, String text,
        ST_Flags flags);
    /* used to get names of symbols */
    Symbol *EXPORT GetResultType(Symbol *sym);
    /* used to get the result type of a function */
```

The GetSymbols method is employed to get the parameters (symbols) of a called procedure, function, or method. The root parameter is the routine being called; this is obtained from the result record. The SQ_Flags parameter is employed to indicate whether the GetSymbols routine should return parameter information. The symList parameter is a pointer to a result vector, which is employed for returning the parameters. The GetSymbolFlags method is employed for getting additional information about parameter and function symbols, such as whether a parameter is a var or const parameter. The routine can also be invoked on the procedure or function symbol itself for determining whether the symbol is a procedure, function, or method. The GetSymbolText method is employed to get the actual text for a symbol, such as the actual name of a parameter. The routine can also be used (with a particular flag setting) to get the name of the type of symbol. This information is used by the IDE to construct the parameter list for display to users. The GetResultType routine is employed to get the result type of a function (i.e., the symbol that represents the result type of a function). After obtaining this symbol, the IDE in turn can invoke GetSymbolText for getting the text or name for the symbol.

H. Determining valid symbols

As previously described, the GetValidSymbols method is employed to get a list of valid symbols. As previously described, the IDE will usually invoke the method twice; first, to get a count of valid symbols, and second to actually get the result (of symbols). In all cases except KK_NONE and KK_ERROR, the IDE can request a list of valid symbols via GetValidSymbols. As the IDE has no way of knowing how much space needs to be allocated for the result, the usual procedure is to call GetValidSymbols with a result and flags parameter of 0 in which case only the count of valid symbols will be reported. After allocating big enough buffers, the system can pass the information to a second call with otherwise identical parameters. Internally, GetValidSymbols typically invokes logic steps that traverse or walk all accessible scopes, applying to each symbol found in a "validation" function that checks whether the symbol would be accessible. Next, the routine invokes additional logic steps for examining each symbol for determining whether it is valid in the current context. If the symbol would be acceptable, it is reported to the IDE; if not, on the other hand, it is skipped.

An exemplary validation function for the context KK_CONST_EXPR (i.e., constant expression), for instance, may be constructed as follows (simplified for clarity of description).

```
static int ValidConstExpr(const KibitzResult *k, Symbol *actualArg)
{
    Type    *argType;
    if      (actualArg->kind != SY_CONST)
        return  FALSE;
    return  IsAssCompat (k->validType, actualArg->type);
}
```

As shown, the function first checks whether the symbol is a constant; if not, the symbol is immediately rejected. If the symbol is a constant, the function then determines whether it is assignment compatible with the type which is expected. The function returns "true" if the symbol is assignment compatible; otherwise, the function returns "false."

Routines are provided for walking different kinds of scopes. A routine that traverses the list of local symbols for a unit, for instance, may be embodied as follows.

```
static int WalkUnitLocals(Symbol *sym, const KibitzResult *k,
        Symbol **result, GF_Flags *flags, int maxCnt, ValidSymbolProc *v)
{
    Type    *t;
    int     cnt;
    cnt = 0;
    for     ( ; sym; sym = sym->next)
    {
```

```
        if     (cnt >= maxCnt)            // stop if we reached the maximum count
        return     cnt;
        if     (sym->name[0] < 'A')       // skip invisible, compiler-generated
        continue;                          // symbols
        if     (sym->decLevel != 0)       // skip local procedures
        continue;
        if     (v(k, sym, 0))             // is this symbol acceptable?
        {
          if     (result)
            result[cnt] = sym;            // yes: report it back
          if     (flags)
            flags[cnt] = GF_NORMAL;
          cnt++;
        else if     (SymbolHasScope(sym, 0, k, v))   // does it have an
        {                                             // acceptable field
          if     (result)
            result[cnt] = sym;            // yes: report it
          if (flags)
            flags[cnt] = GF_SCOPE;        // and flag it as such
          cnt++;
        }
      }
      return    cnt;
}
```

The method is invoked with the following parameters: a list of symbols (i.e., local symbols of the unit), a result record, a result vector, a flags parameter, a maximum count, and a pointer to a validation procedure. In operation, the method traverses the symbol list, keeping track of the count of acceptable symbols. At the "for" loop, the method determines whether it already has a sufficient number of symbols; if so, the method is done and may return. Otherwise, the method enters the "for" loop.

Within the "for" loop, the method skips compiler-generated names; these will have names which are not legal for the underlying computer language (e.g., Pascal). Next, the method skips objects which are not at the global declaration level, such as local functions. If the symbol passes these tests, the method applies a validation function to it. If the validation function returns "true," then the symbol is flagged as a normal symbol. Even if the symbol is not accepted by the validation function, it might nevertheless have a field which is acceptable (e.g., a member field of a structure). If the symbol (or a field of a symbol) is acceptable, it is added to the result array; corresponding flags for the symbol are set in the flags array. As an optimization, the IDE performs a CompilerKibitz call in the background at certain times, so used units, source files, and the like get loaded into the compiler or the operating system's disk cache.

I. Avoiding infinite cycles

A particular difficulty is encountered when determining whether a structure has an acceptable field. If precautions are not taken, the system might be trapped in a "cycle." Consider, for instance, a TForm data structure. A TForm structure often includes components which are themselves of type TForm. Accordingly, extra care is required to avoid infinite incursion when traversing or walking a field list of a structure.

To prevent this problem, the system adopts the following approach. For each type examined, the system keeps track of the "state" of the type—that is, what the system knows about the type. In an exemplary embodiment, four states are defined as follows.

```
// states a type can be in - all types start out as TS_UNKNOWN
typedef     enum
{
    TS_UNKNOWN,   //   don't know whether this type is acceptable
    TS_FALSE,     //   know this type is not acceptable
    TS_TRUE,      //   know this type is acceptable
    TS_ACTIVE,    //   working to find out whether this type is
                  //   acceptable
}    TypeState;
```

The first state, TS_UNKNOWN, indicates that the system does not know whether the type is acceptable. The second state, TS_FALSE, indicates that the system knows that the type is not acceptable. As an example of use, an assignment statement which assigns a floating point variable to an integer variable will not be acceptable and, thus, would be identified as TS_FALSE. TS_TRUE, the third state, indicates that the type is acceptable. Finally, TS_ACTIVE indicates a state where the system is working to determine whether the type is acceptable.

A method, SymbolHasScope, for determining whether a symbol has an acceptable type for a given context may be constructed as follows.

```
// find out whether a symbol with acceptable type can be reached
// from type
static int SymbolHasScope(Type *type, const KibitzResult *k,
      ValidSymbolProc *v)
```

-continued

```
{
    Type      *type;
    switch      (type->g.form)
    case      TF_CLASSREF:      // only these types have scopes at all
    case      TF_INSTANCE:
    case      TF_RECORD:
    case      TE_OBJECT:
      switch      (GetTypeState (type))
      {
      case      TS_TRUE:     return    TRUE;     // know the answer is TRUE
      case      TS_FALSE:    return    FALSE;    // know the answer is FALSE
      case      TS_ACTIVE:   return    FALSE;    // cut off recursion here
      case      TS_UNKNOWN:                      // need to do some work here
          SetTypeState(type, TS_ACTIVE);
          if    (WalkFieldScope(type, k, v))     // any acceptable fields?
          {
            SetTypeState(type, TS_TRUE);         // yes: remember
            return    TRUE;                      answer is TRUE
          }
          else
          {
            SetTypeState(type, TS_FALSE);        // no: remember
            return    FALSE;                     // anser is FALSE
          }
      }
    default:
      return    FALSE;                           // type doesn't have scope
    }
}
```

As shown, the method is implemented as a large case or "switch" statement which serves to determine whether the type has any scope at all (i.e., has fields). If it does have a scope, the method proceeds to retrieve the state of the type. This state is tested by a nested "switch" statement. If the state is known to be true (TS_TRUE) or false (TS_FALSE), the method can return "true" or "false," respectively. If, on the other hand, the state is "active" (TS_ACTIVE), the method returns "false," for presenting incursion or reentry.

If the type is unknown, the method proceeds to determine the type as follows. First, if type state is set to "active" (TS_ACTIVE), for indicating that the system is in the process of determining the state. Next, the method traverses or walks the list of symbols for this scope, by invoking a WalkFieldScope helper routine. This call will determine whether the structure has a field which is accepted by the validation function. If it is acceptable, WalkFieldScope will return "true," whereupon the state of the type can be set to "true" (TS_TRUE). Otherwise, the state is set to "false" (TS_FALSE). Also, if the type does not have a scope, the SymbolHasScope method returns "false."

As an optimization to avoid having to initialize all types to TS_UNKNOWN before calling the above routine, an additional table and an auxiliary field in the type structure is used to cache type results as follows.

```
type      struct
{
    TypeState      typeState;      // state of the type
    Type           *type;          // pointer back to type
}   TypeEntry;
static    TypeEntry    *typeTab;
static    ulong        typeCnt;
static    ulong        maxCnt;
```

Here, the system can index into the table for determining whether the type has already been processed before.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a development system, a method for assisting a user with inputting source code for a computer program, the method comprising:

detecting a need for assisting the user with input for a source code module under development;

determining a current cursor position representing a location in the source code module where the user is currently providing input;

determining input items which are suitable for input in the source code module at the current cursor position;

displaying to the user a list of said suitable input items; and in response to selection by the user of a particular item from the list, automatically completing input at the current cursor position;

wherein said detecting step includes:
      determining instances in the source code module where the system can automatically provide input; and wherein said detecting step includes:
      determining in the source code module use of a structure variable which references a nested data member.

2. In a development system, a method for assisting a user with inputting source code for a computer program, the method comprising:

detecting a need for assisting the user with input for a source code module under development;

determining a current cursor position representing a location in the source code module where the user is currently providing input;

determining input items which are suitable for input in the source code module at the current cursor position;

displaying to the user a list of said suitable input items; and in response to selection by the user of a particular item from the list, automatically completing input at the current cursor position;

wherein said current cursor position comprises a line number and a column position for a particular source code file.

3. In a development system, a method for assisting a user with inputting source code for a computer program, the method comprising:

detecting a need for assisting the user with input for a source code module under development:

determining a current cursor position representing a location in the source code module where the user is currently providing input;

determining input items which are suitable for input in the source code module at the current cursor position:

displaying to the user a list of said suitable input items; and in response to selection by the user of a particular item from the list, automatically completing input at the current cursor position;

wherein said step of determining input items which are suitable for input in the source code module includes:

determining which variables are within scope for the current cursor position; and eliminating as a suitable input item any item that is not within scope for the current cursor position; and wherein said step of determining input items which are suitable for input in the source code module at the current cursor position includes:

compiling the source code module up to the current cursor position.

4. In a development system, a method for assisting a user with inputting source code for a computer program, the method comprising:

detecting a need for assisting the user with input for a source code module under development;

determining a current cursor position representing a location in the source code module where the user is currently providing input;

determining input items which are suitable for input in the source code module at the current cursor position;

displaying to the user a list of said suitable input items; and in response to selection by the user of a particular item from the list, automatically completing input at the current cursor position;

wherein said step of determining input items which are suitable for input in the source code module includes:

determining which variables are within scope for the current cursor position; and eliminating as a suitable input item any item that is not within scope for the current cursor position; and wherein said step of compiling the source code module up to the current cursor position includes:

skipping compilation of any method defined in the source code unless the cursor is currently positioned within the method.

5. In a development system, a method for assisting a user with inputting source code for a computer program, the method comprising:

detecting a need for assisting the user with input for a source code module under development;

determining a current cursor position representing a location in the source code module where the user is currently providing input;

determining input items which are suitable for input in the source code module at the current cursor position;

displaying to the user a list of said suitable input items; and in response to selection by the user of a particular item from the list, automatically completing input at the current cursor position;

wherein said list of suitable input items includes items which are suitable by virtue of having a nested member which is suitable.

* * * * *

UNITED STATES PATENT AND TRADEMARK OFFICE
CERTIFICATE OF CORRECTION

PATENT NO. : 6,314,559 B1
DATED : November 6, 2001
INVENTOR(S) : Peter Franz Valentin Sollich It is certified that error appears in the above-identified patent and that said Letters Patent is hereby corrected as shown below:

<u>Title page,</u>
Item [73] Assignee, change "Barland" to -- Borland --.

Signed and Sealed this

Twenty-first Day of May, 2002

Attest:

Attesting Officer

JAMES E. ROGAN
Director of the United States Patent and Trademark Office